US012694758B2

(12) United States Patent
Kendall et al.

(10) Patent No.: US 12,694,758 B2
(45) Date of Patent: Jul. 28, 2026

(54) SYSTEMS AND METHODS FOR PROVIDING OUTPUT AMOUNTS BASED UPON NUMERICAL SYMBOL PRESENTATION

(71) Applicant: Aristocrat Technologies Australia Pty Limited, North Ryde (AU)

(72) Inventors: Karen Kendall, Toongabbie (AU); Lipi Gupta, Newington (AU); Eric Lie, Winston Hills (AU); Geoffrey Richardson, Baulkham Hills (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 228 days.

(21) Appl. No.: 18/419,155

(22) Filed: Jan. 22, 2024

(65) Prior Publication Data

US 2025/0104524 A1 Mar. 27, 2025

(30) Foreign Application Priority Data

Sep. 25, 2023 (AU) ................................ 2023237031

(51) Int. Cl.
*G07F 17/32* (2006.01)

(52) U.S. Cl.
CPC ...... *G07F 17/3267* (2013.01); *G07F 17/3213* (2013.01); *G07F 17/3244* (2013.01)

(58) Field of Classification Search
CPC ............. G07F 17/3267; G07F 17/3213; G07F 17/3244; G07F 17/34
See application file for complete search history.

(56) References Cited

U.S. PATENT DOCUMENTS 4,200,291 A * 4/1980 Hooker .................... G07F 17/34 273/143 R
5,704,835 A * 1/1998 Dietz, II ............. G07F 17/3265 463/20
5,927,714 A * 7/1999 Kaplan .................... G07F 17/34 463/20
6,089,977 A * 7/2000 Bennett .................... G07F 17/34 463/20
6,165,070 A * 12/2000 Nolte ...................... G07F 17/34 463/16
6,186,894 B1 * 2/2001 Mayeroff ................ G07F 17/34 463/16
6,270,412 B1 * 8/2001 Crawford ............ G07F 17/3265 463/20
6,290,600 B1 * 9/2001 Glasson .............. G07F 17/3265 463/20

(Continued)

*Primary Examiner* — Chase E Leichliter
(74) *Attorney, Agent, or Firm* — Armstrong Teasdale LLP

(57) ABSTRACT

An electronic gaming device including a processor and a memory is described. The processor is configured to select a plurality of symbols including a plurality of numerical values and determine that at least one symbol includes at least one numerical value within a predefined range. The processor is also configured to cause display of the at least one symbol in a hidden state and cause display of the plurality of symbols other than the at least one symbol. The processor is also configured to cause display of the at least one symbol to transition between the hidden state and a revealed state wherein when the at least one symbol is displayed in the revealed state the at least one numerical value is displayed and provide an output amount associated with a sum of the plurality of numerical values.

20 Claims, 28 Drawing Sheets

(56) References Cited

U.S. PATENT DOCUMENTS

| | | | | | |
|---|---|---|---|---|---|
| 6,315,663 | B1 * | 11/2001 | Sakamoto | G07F 17/3265 | 463/20 |
| 6,413,162 | B1 * | 7/2002 | Baerlocher | G07F 17/3211 | 463/20 |
| 6,561,900 | B1 * | 5/2003 | Baerlocher | G07F 17/34 | 463/20 |
| 6,589,114 | B2 * | 7/2003 | Rose | G07F 17/3265 | 463/20 |
| 6,641,477 | B1 * | 11/2003 | Dietz, II | G07F 17/3265 | 463/16 |
| 6,666,766 | B2 * | 12/2003 | Baerlocher | G07F 17/3267 | 463/16 |
| 6,832,957 | B2 * | 12/2004 | Falconer | G07F 17/34 | 463/20 |
| 6,893,342 | B1 * | 5/2005 | Singer | G07F 17/3262 | 463/20 |
| 6,942,571 | B1 * | 9/2005 | McAllister | G07F 17/3209 | 463/20 |
| 7,674,176 | B2 * | 3/2010 | Berman | G07F 17/34 | 463/16 |
| 7,690,985 | B1 * | 4/2010 | Muskin | G07F 17/34 | 463/19 |
| 8,435,110 | B2 * | 5/2013 | Svanas | G07F 17/32 | 463/20 |
| 9,165,433 | B2 * | 10/2015 | Caputo | G07F 17/3216 | |
| 9,576,423 | B2 * | 2/2017 | Shai-Hee | G07F 17/3213 | |
| 9,626,840 | B2 * | 4/2017 | Williamson | G07F 17/34 | |
| 9,666,033 | B2 * | 5/2017 | Lathrop | G07F 17/32 | |
| 9,805,553 | B2 * | 10/2017 | Zielinski | G07F 17/3267 | |
| 10,068,414 | B2 * | 9/2018 | Shai-Hee | G07F 17/34 | |
| 10,366,575 | B2 * | 7/2019 | Visser | G07F 17/3213 | |
| 10,636,243 | B1 * | 4/2020 | Davis | G07F 17/3213 | |
| 10,733,834 | B1 * | 8/2020 | Hiten | G07F 17/3288 | |
| 11,189,137 | B2 * | 11/2021 | Hufnagl-Abraham | G07F 17/34 | |
| 2002/0045474 | A1 * | 4/2002 | Singer | G07F 17/3216 | 463/20 |
| 2003/0060268 | A1 * | 3/2003 | Falconer | G07F 17/34 | 463/20 |
| 2003/0064783 | A1 * | 4/2003 | Baerlocher | G07F 17/3244 | 463/20 |
| 2003/0125102 | A1 * | 7/2003 | Cannon | G07F 17/34 | 463/20 |
| 2004/0043812 | A1 * | 3/2004 | Ellis | G07F 17/34 | 463/20 |
| 2004/0048646 | A1 * | 3/2004 | Visocnik | G07F 17/32 | 463/16 |
| 2005/0054414 | A1 * | 3/2005 | Gauselmann | G07F 17/32 | 463/16 |
| 2005/0059454 | A1 * | 3/2005 | McComb | G07F 17/3213 | 463/16 |
| 2005/0119043 | A1 * | 6/2005 | Berman | G07F 17/3211 | 463/20 |
| 2005/0143165 | A1 * | 6/2005 | Berman | G07F 17/32 | 463/20 |
| 2006/0030387 | A1 * | 2/2006 | Jackson | G07F 17/3211 | 463/16 |
| 2006/0189379 | A1 * | 8/2006 | Pacey | G07F 17/3267 | 463/20 |
| 2007/0129135 | A1 * | 6/2007 | Marks | G07F 17/3262 | 463/20 |
| 2008/0064466 | A1 * | 3/2008 | Saito | G07F 17/34 | 463/16 |
| 2008/0090636 | A1 * | 4/2008 | Lathrop | G07F 17/34 | 463/20 |
| 2009/0117991 | A1 * | 5/2009 | Yoshizawa | G07F 17/34 | 463/21 |
| 2009/0247270 | A1 * | 10/2009 | Shai-Hee | G07F 17/3265 | 463/20 |
| 2011/0165934 | A1 * | 7/2011 | Marks | G07F 17/34 | 463/20 |
| 2013/0035150 | A1 * | 2/2013 | Owen | G07F 17/3265 | 463/20 |
| 2014/0066162 | A1 * | 3/2014 | Basallo | G07F 17/3213 | 463/18 |
| 2014/0087832 | A1 * | 3/2014 | Zoltewicz | G07F 17/3213 | 463/20 |
| 2015/0161853 | A1 * | 6/2015 | Ryan | G07F 17/34 | 463/20 |
| 2018/0082547 | A1 * | 3/2018 | Lathrop | G07F 17/32 | |
| 2018/0130285 | A1 * | 5/2018 | Ang | G07F 17/3244 | |
| 2018/0268659 | A1 * | 9/2018 | Chesworth | G07F 17/3251 | |
| 2019/0244481 | A1 * | 8/2019 | Jaffe | G07F 17/34 | |
| 2021/0049861 | A1 * | 2/2021 | Sahl | G07F 17/3267 | |
| 2022/0028220 | A1 * | 1/2022 | Milosevich | G07F 17/3213 | |
| 2022/0309866 | A1 * | 9/2022 | Peterson | G07F 17/3262 | |
| 2023/0098777 | A1 * | 3/2023 | Cohn | G07F 17/34 | 463/20 |
| 2023/0122122 | A1 * | 4/2023 | Sidoti | G07F 17/3213 | 463/20 |
| 2023/0230440 | A1 * | 7/2023 | Jones | G07F 17/326 | 463/31 |
| 2023/0237877 | A1 * | 7/2023 | Sanborn | G07F 17/326 | 463/25 |
| 2023/0245528 | A1 * | 8/2023 | Bouvier | G07F 17/3225 | 463/20 |
| 2023/0419787 | A1 * | 12/2023 | Tsombanidis | G07F 17/34 | |
| 2024/0054860 | A1 * | 2/2024 | Leggett | G07F 17/3213 | |
| 2024/0119795 | A1 * | 4/2024 | Mariscal | G07F 17/3262 | |
| 2024/0144770 | A1 * | 5/2024 | Colovic | G07F 17/3244 | |
| 2024/0144771 | A1 * | 5/2024 | Turner | G07F 17/3213 | |
| 2024/0242571 | A1 * | 7/2024 | Dale | G07F 17/3244 | |
| 2024/0242572 | A1 * | 7/2024 | Dale | G07F 17/3213 | |
| 2024/0304063 | A1 * | 9/2024 | Robards | G07F 17/3267 | |
| 2024/0378941 | A1 * | 11/2024 | Dies | G07F 17/3267 | |
| 2025/0046144 | A1 * | 2/2025 | Albright | G07F 17/3211 | |
| 2025/0069479 | A1 * | 2/2025 | Walsh | G07F 17/34 | |
| 2025/0087056 | A1 * | 3/2025 | Nauman | G07F 17/34 | |
| 2025/0087059 | A1 * | 3/2025 | Delekta | G07F 17/34 | |
| 2025/0095432 | A1 * | 3/2025 | Walsh | G07F 17/3244 | |
| 2025/0095443 | A1 * | 3/2025 | Hickox | G07F 17/34 | |
| 2025/0104524 | A1 * | 3/2025 | Kendall | G07F 17/34 | |

* cited by examiner

300

| | 341 Reel Strip 1 | 342 Reel Strip 2 | 343 Reel Strip 3 | 344 Reel Strip 4 | 345 Reel Strip 5 |
|---|---|---|---|---|---|
| 301 | A | 10 | Q | GOLD PIC4 | PIC1 |
| 302 | PIC3 | J | K | PIC2 | SCAT |
| 303 | GOLD PIC4 | GOLD PIC4 | 9 | PIC3 | PIC3 |
| 304 | PIC2 | PIC4 | PIC2 | 9 | Q |
| 305 | K | A | PIC1 | Q | A |
| 306 | SCAT | SCAT | 10 | A | Q |
| 307 | PIC3 | PIC1 | K | A | Q |
| 308 | A | J | WILD | 10 | WILD |
| 309 | J | Q | J | PIC2 | K |
| 310 | 10 | K | PIC3 | K | 9 |
| 311 | A | 9 | Q | PIC1 | GOLD PIC4 |
| 312 | PIC3 | K | GOLD PIC4 | SCAT | GOLD PIC4 |
| 313 | 10 | 10 | SCAT | A | 10 |
| 314 | SCAT | SCAT | Q | J | Q |
| 315 | K | WILD | Q | 10 | A |
| 316 | PIC1 | J | 10 | A | 10 |
| 317 | J | J | A | PIC4 | K |
| 318 | Q | A | SCAT | PIC4 | A |
| 319 | PIC4 | PIC2 | PIC2 | 9 | J |
| 320 | GOLD PIC4 | PIC3 | Q | PIC2 | PIC3 |
| 321 | PIC1 | 9 | A | PIC1 | PIC4 |
| 322 | A | PIC4 | J | WILD | 10 |
| 323 | J | K | J | PIC3 | J |
| 324 | Q | Q | PIC4 | Q | Q |
| 325 | PIC2 | Q | 9 | A | PIC3 |
| 330 | ... | ... | ... | ... | ... |

FIG. 3

FIG. 14
845A
1470
1400
845
844
843
842
841
1460
GRAND JACKPOT
15 AWARDS
$ 25,000.00
13 TO 14 625
9 TO 12 300
6 TO 8 200
5 OR LESS 125
Brazil
GRAND
GRAND JACKPOT
WINNER!
$ 25,000.00
3975
144
25

FIG. 16
1600
GRAND JACKPOT
$25,000.01
Brazil
GRAND
1680
1 FREE GAME PLAYED
ARE WILD, REPEATS YOUR WIN AND SLIDES DOWN EACH SPIN!
1651
713
712
711
Q
10
9
K
J
J
Q
10
8983
250
25
721
722
1681
723
724
725

FIG. 17
1700
GRAND
$25,000.01
Brazil
1 FREE GAME PLAYED
GRAND
ARE WILD, REPEATS YOUR WIN AND
DES DOWN EACH SPIN!
REPLAY WIN
REPLAY WIN
REPLAY WIN
REPLAY WIN
Q
10
9
K
J
J
Q
10
286
25
1680
1651A
713
712
711
721
722
723
724
725

*FIG. 18*
1800
GRAND JACKPOT
$25,000.01
Brazil
GRAND
3 FREE GAMES PLAYED
1680
1851
1853
1852
713
712
711
REPEAT WIN
REPEAT WIN
REPEAT WIN
REPEAT WIN
REPEAT WIN
8983
8461
25
721
722
723
724
725

FIG. 19
1900
GRAND JACKPOT
$25,000.01
Brazil
GRAND
4 FREE GAMES PLAYED
FREE GAMES WILL CONTINUE TO PLAY WITH ANY SLIDING
10440
25
1680
713
1851A
712
711
1853A
1852A
721
722
723
724
725

FIG. 20
2000
GRAND JACKPOT
$25,000.01
GRAND
4 FREE GAMES PLAYED
1680
713
1851B
712
711
1853B
1852B
Q
J
K
10
REPEAT WIN
J
Q
J
10467
25
721
722
723
724
725

FIG. 22
2200
GRAND JACKPOT
$25,000.01
Brazil
GRAND
1680
9 FREE GAMES PLAYED
713
712
711
REPEAT WIN
REPEAT WIN
REPEAT WIN
8983
46762
25
721
722
723
724
725

SYSTEMS AND METHODS FOR PROVIDING OUTPUT AMOUNTS BASED UPON NUMERICAL SYMBOL PRESENTATION

CROSS REFERENCE TO RELATED APPLICATIONS

This application claims the benefit of priority to Australia Patent Application No. 2023237031, filed Sep. 25, 2023, the contents of which are incorporated by reference herein in their entirety.

FIELD

The present application relates to a gaming device, a method of operating a gaming device and a system with a prize award based on numerical symbol selection.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

In one aspect, an electronic gaming device is described. The electronic gaming device includes at least one memory with instructions stored thereon and at least one processor in communication with the at least one memory, wherein the instructions, when executed by the at least one processor, cause the at least one processor to select a plurality of symbols from a set of symbols for a play of an electronic game wherein the plurality of symbols include a plurality of numerical values from a set of numerical values in the at least one memory and determine that at least one symbol of the plurality of symbols includes at least one numerical value of the plurality of numerical values within a predefined range of numerical values stored in the at least one memory. The instructions also cause the at least one processor to, based upon the at least one numerical value being within the predefined range, cause display of the at least one symbol in a hidden state such that the at least one numerical value is not displayed and cause display of the plurality of symbols other than the at least one symbol such that the plurality of numerical values other than the at least one numerical value within the predefined range are displayed. The instructions further cause the at least one processor to cause display of the at least one symbol to transition between the hidden state and a revealed state wherein when the at least one symbol is displayed in the revealed state the at least one numerical value is displayed and provide an output amount associated with a sum of the plurality of numerical values.

In another aspect, at least one non-transitory computer-readable storage medium with instructions stored thereon is described. The instructions, in response to execution by at least one processor, cause the at least one processor to determine a plurality of symbols from a set of symbols for a play of an electronic game wherein the plurality of symbols include a plurality of numerical values from a set of numerical values in the at least one non-transitory computer-readable storage medium and identify that at least one symbol of the plurality of symbols includes at least one numerical value of the plurality of numerical values within a predefined range of numerical values stored in the at least one non-transitory computer-readable storage medium. The instructions also cause the at least one processor to, based upon the at least one numerical value being within the predefined range, cause the at least one symbol to be displayed in a hidden state such that the at least one numerical value is not displayed and cause the plurality of symbols other than the at least one symbol to be displayed such that the plurality of numerical values other than the at least one numerical value within the predefined range are displayed. The instructions further cause the at least one processor to cause the at least one symbol to be displayed as transitioning between the hidden state and a revealed state wherein when the at least one symbol is displayed in the revealed state the at least one numerical value is displayed and cause an output amount associated with a sum of the plurality of numerical values to be provided.

In another aspect, a method of electronic gaming implemented by one or more processors in communication with one or more memories is provided. The method includes selecting a plurality of symbols from a set of symbols for a play of an electronic game wherein the plurality of symbols include a plurality of numerical values from a set of numerical values in the one or more memories and determining that at least one symbol of the plurality of symbols includes at least one numerical value of the plurality of numerical values within a predefined range of numerical values stored in the one or more memories. The method also includes, based upon the at least one numerical value being within the predefined range, causing display of the at least one symbol in a hidden state such that the at least one numerical value is not displayed and causing display of the plurality of symbols other than the at least one symbol such that the plurality of numerical values other than the at least one numerical value within the predefined range are displayed. The method further includes causing display of the at least one symbol to transition between the hidden state and a revealed state wherein when the at least one symbol is displayed in the revealed state the at least one numerical value is displayed and providing an output amount associated with a sum of the plurality of numerical values.

An example embodiment describes a gaming device including a display, a random number generator, a processor, and a memory storing instructions. When the instructions are executed by the processor, they cause the processor to select, for a defined set of symbol positions using the random number generator, symbols from reel strips including symbols including numerical values of a set of numerical values, control the display to display the numerical values of the symbols selected for the defined set of symbol positions, determine a total of the displayed numerical values of the symbols selected for the defined set of symbol positions, determine an award based on the determined total and a pay table in the memory that associates possible totals derivable from the numerical values with a plurality of different awards; and make the determined award.

Another example embodiment describes a method of operating a gaming device including a display, a random number generator. The method includes selecting, for a defined set of symbol positions using the random number generator, symbols from reel strips including symbols including numerical values of a set of numerical values, controlling the display to display the numerical values of the symbols selected for the defined set of symbol positions, determining a total of the displayed numerical values of the symbols selected for the defined set of symbol positions, determining an award based on the determined total and a pay table in the memory that associates possible totals derivable from the numerical values with a plurality of different awards, and making the determined award.

Another example embodiment describes a system including at least one display, a random number generator, one or more processors, and memory storing instructions. When the instructions are executed by the one or more processors, cause the one or more processors to select, for a defined set of symbol positions using the random number generator, symbols from reel strips including symbols including numerical values of a set of numerical values, control the display to display the numerical values of the symbols selected for the defined set of symbol positions, determine a total of the displayed numerical values of the symbols selected for the defined set of symbol positions, determine an award based on the determined total and a pay table in the memory that associates possible totals derivable from the numerical values with a plurality of different awards; and make the determined award.

BRIEF DESCRIPTION OF THE DRAWINGS

FIG. 3 illustrates an example reel strip layout.

DETAILED DESCRIPTION

Figure 1:
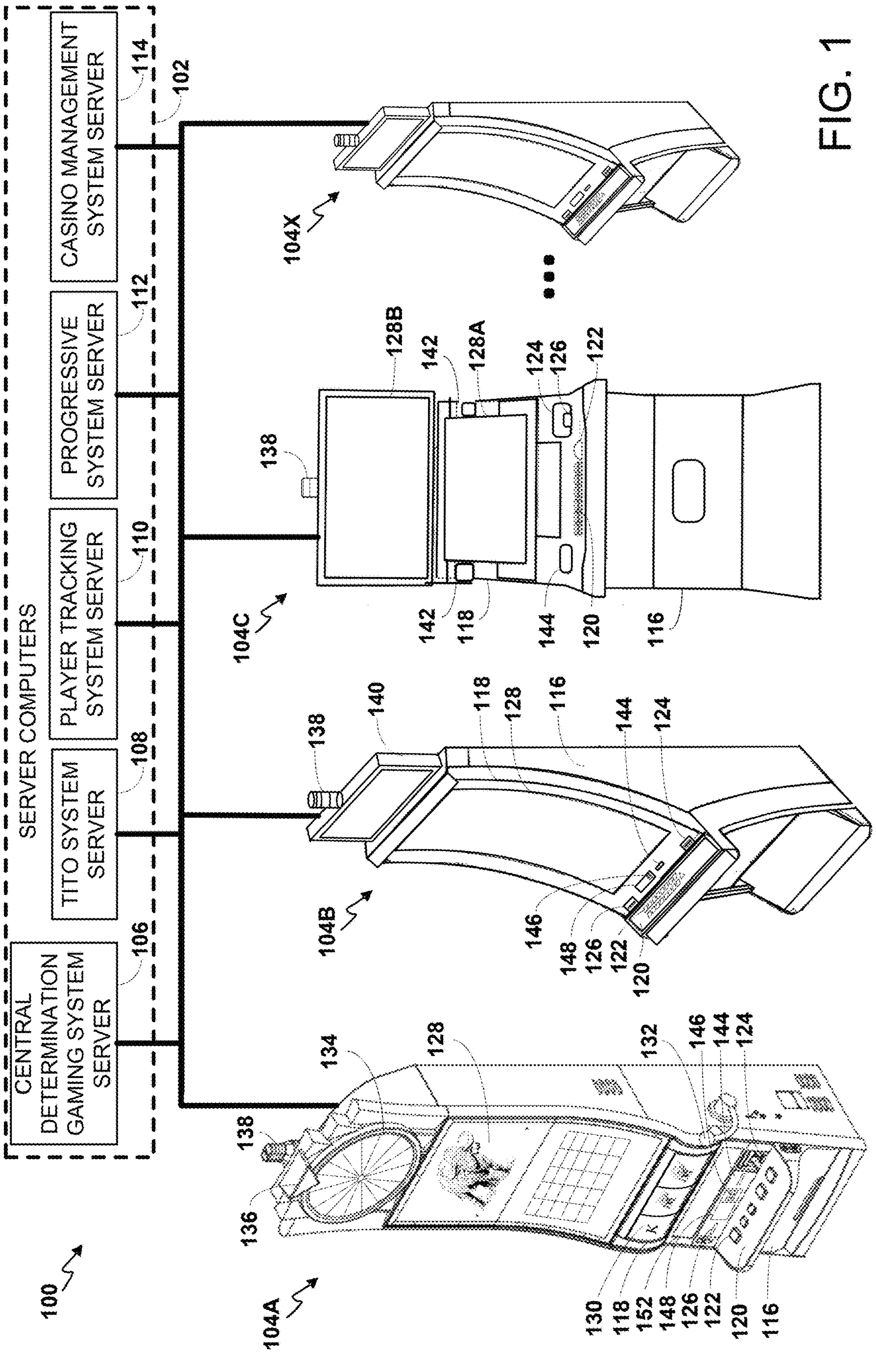
FIG. 1 is an exemplary diagram showing several EGMs networked with various gaming related servers.

In the example embodiment, systems and methods for providing output amounts based upon numerical symbol presentation are provided. Embodiments of the present disclosure relate to EGMs configured to implement a feature game in response to a trigger condition being met. One feature game involves selecting symbols from reel strips where the symbols have numerical values. Advantageously, this allows a total to be derived from the numerical values. In an example, the total is used to determine a prize outcome based on prizes defined by a pay table, wherein different ones of the prizes are associated with different possible totals derivable from the numerical values.

The technical problems addressed herein include at least one of: (i) inability of known systems to hide display of game outcomes until numerical value symbols are revealed; (ii) inability of known systems to dynamically determine numerical values associated with symbols to control RTP during play of an electronic game; (iii) inability of known systems to display different backgrounds at different symbol positions to provide a visual indication as to how game outcomes are determined; and (iv) inability of known systems to provide flexibility in providing game outcomes while controlling RTP and efficiently communicating game outcomes.

The resulting technical effects and/or technical benefits achieved by this disclosure include at least one of: (i) ability to hide display of game outcomes until numerical value symbols are revealed; (ii) ability to dynamically determine numerical values associated with symbols to control RTP during play of an electronic game; (iii) ability to display different backgrounds at different symbol positions to provide a visual indication as to how game outcomes are determined; (iv) ability to provide flexibility in providing game outcomes while controlling RTP and efficiently communicating game outcomes; (v) displaying large quantities of complex information in a relatively small display area; (vi) communicating complex information with easy-to-understand animations on a display; (vii) efficiently communicating different game rules on a display during game play; and (ix) providing versatility as to which devices (e.g., EGMs, mobile devices, etc.) the games described herein may be played on because of the efficient display area designs described herein.

Various interface improvements are provided herein to efficiently and effectively communicate information. For instance, during play of an electronic game, as described herein, various animations are provided to communicate which symbols have a known (e.g., to the player) value associated therewith and which symbols have a mystery value associated therewith (e.g., that may be randomly determined during play of the electronic game). As an example, mystery symbols may have their values dynamically determined by a processor conducting a random determination using a weight table (e.g., to control RTP) in memory to assign a numerical value each time a mystery symbol is selected.

Example embodiments described herein may be provided in combination or in isolation to summarize and present game mechanics in a manner that improves the efficiency of computer systems (e.g., electronic gaming systems including electronic gaming devices). Each example system provides an improved user interface displaying a limited set of information to players, potentially within a small screen, such that players can more quickly understand the current status of the game. The systems and methods provide improved display device functionality (e.g., on a gaming device) by providing multiple visual indicators that communicate game mechanics described herein to players. The systems and methods provided herein also improve display and device efficiency by eliminating the need for complex information pages describing game mechanics to players. Because of at least the easily-understood animations, symbols, and indicators displayed, the games described herein can be played and understood on a single screen substantially smaller than some of the EGMs described herein (e.g., a mobile device such as a cell phone), thus removing the need for multiple displays with complex information screens including lengthy text.

FIG. 1 illustrates several different models of EGMs which may be networked to various gaming related servers. The present embodiments can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present embodiments may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 including a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a “ticket-in” reader that allows the player to use a casino issued credit ticket to load credits onto the gaming device 104A (e.g., in a cashless ticket (“TITO”) system). In such cashless embodiments, the gaming device 104A may also include a “ticket-out” printer 126 for outputting a credit ticket when a “cash out” button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player’s smartphone, a keypad 146, and/or an illuminated display 148 for reading, receiving, entering, and/or displaying player tracking information is provided in gaming device 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
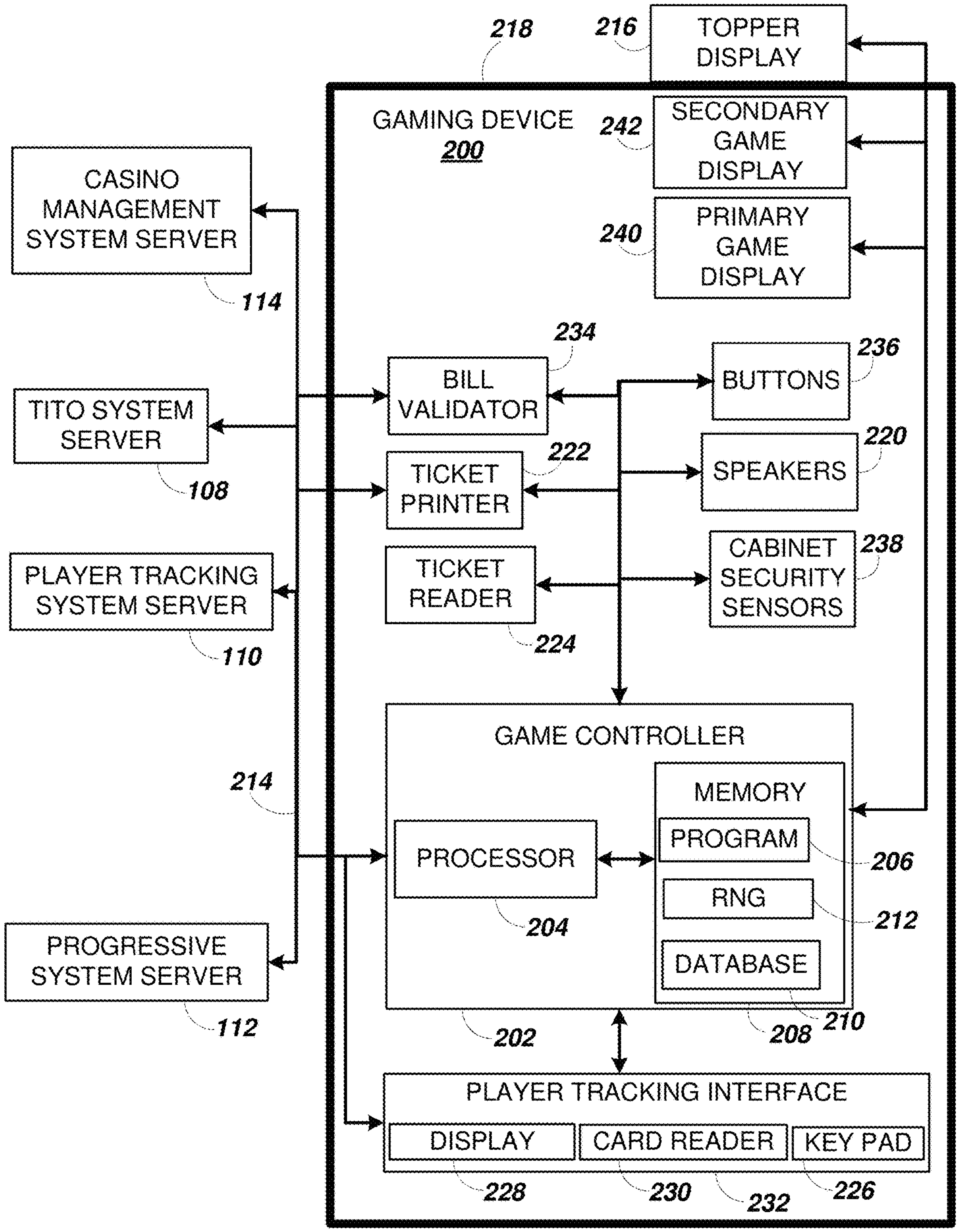
FIG. 2 is a block diagram showing various functional elements of an exemplary EGM.

Many or all the above-described components can be controlled by circuitry (e.g., a gaming controller) housed inside the main cabinet 116 of the gaming device 104A, the details of which are shown in FIG. 2.

Note that not all gaming devices suitable for implementing the present embodiments necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (e.g., a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input mechanism such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The credit balance may be stored in a meter in memory 208 (or in a separate hardware meter). In some embodiment, memory 208 implements a credit meter to monitor to the credit balance and has a win meter that monitors any amounts won during any game instance(s) resulting from the wager. The balance of the win meter is transferred to the credit meter prior at the conclusion of the game instances. The player may also optionally insert a loyalty club card into the card reader 230. In some embodiments, the loyalty club card may also act as a credit input mechanism, by allowing a player to transfer funds from a centrally stored balance in order to establish a credit balance. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
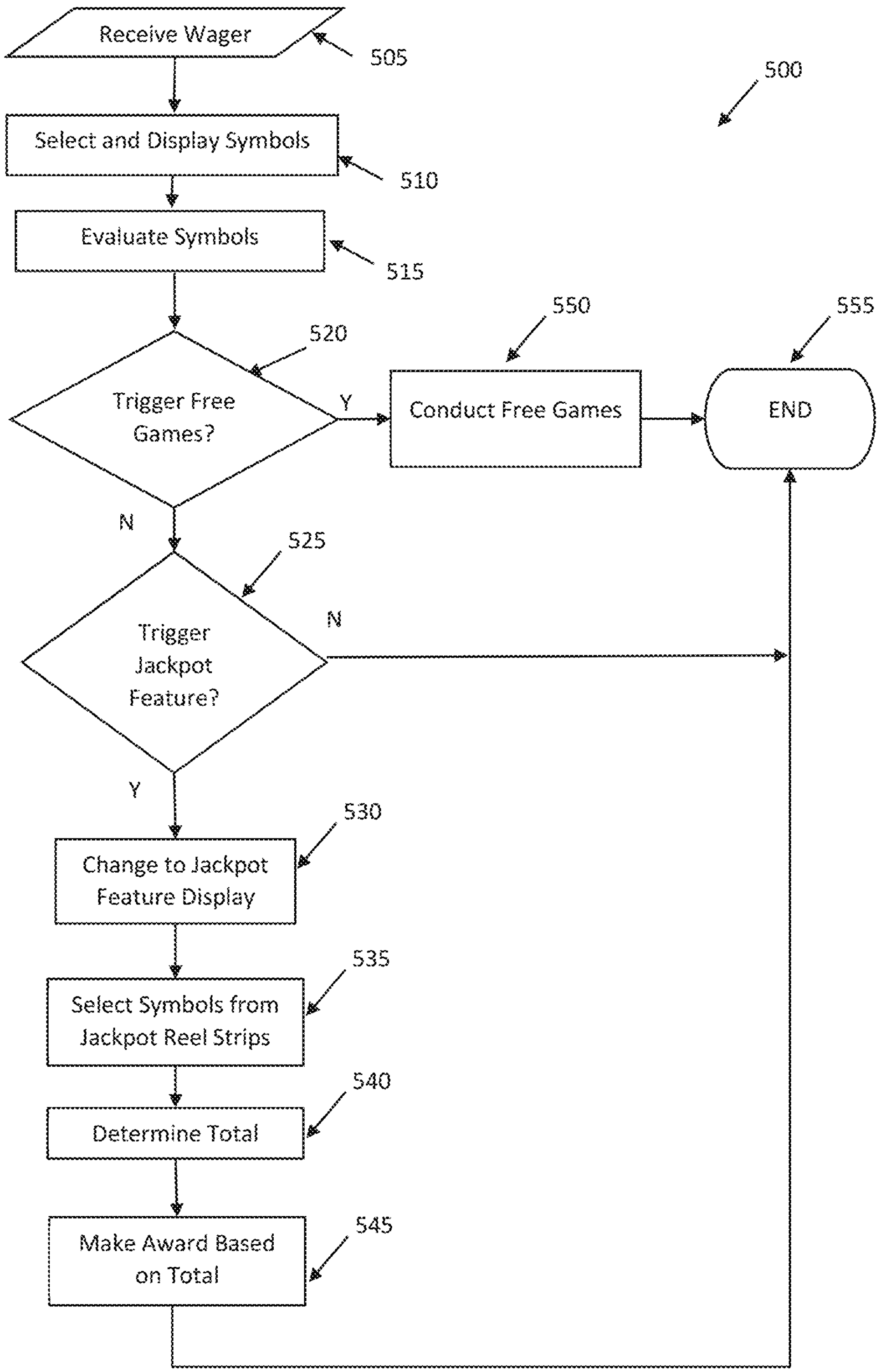
FIG. 5 is a flow chart of a method of operating a gaming device.

FIG. 5 is a flow chart of an example embodiment of a method 500 of operating a gaming device 200. The example method 500 broadly involves conducting a base game in response to receipt of a wager by selecting symbols from reel strips, evaluating the selected symbols for winning combinations, and conducting a feature game if one is triggered.

In this respect, FIG. 3 illustrates an example of a set 300 of five reel strips 341, 342, 343, 344, 345. In the example, for illustrative purposes, twenty-five reel strip positions 301-325 are shown for each reel strip 341-345. Each reel strip position of each reel has a symbol. For example, a "PIC1" symbol occupies the twenty-first reel strip position 321 of the fourth reel 344. The symbols shown on the reel strip are generally indicative of symbols that may be employed in the embodiments. Symbol position 330 indicates that the reel strips 341-345 may have more symbols than illustrated. For example, the reel strips 341-345 could have between 30 and 100 reel strip positions with the last reel strip position of a respective reel strip being treated as contiguous with the first reel strip position 301 as would be the case with a mechanical reel. The actual lengths of the game reel strips depend on factors such as the lengths of the stacks, the number of wild symbols (in general, the more wilds there are, the longer the reel strip needs to be to maintain the target RTP), and volatility (in general, the higher the prize value is, the longer the reel strip needs to be to lower the hit rate to maintain the target RTP). In some examples, the reel strips associated with different columns may be of different lengths to one another.

Figure 7:
FIGS. 7 to 28 are example screen displays.

At step 510, processor 204 selects symbols from reel strips for a spinning reel game and controls the display 240 to display the selected symbols. FIG. 7 shows an example screen display 700 of a base game where symbols are selected from five reel strips for display in five columns of symbol positions 721-725 with three symbols being selected from each reel strip such that there are also three rows 711-713 of symbol positions.

Figure 4:
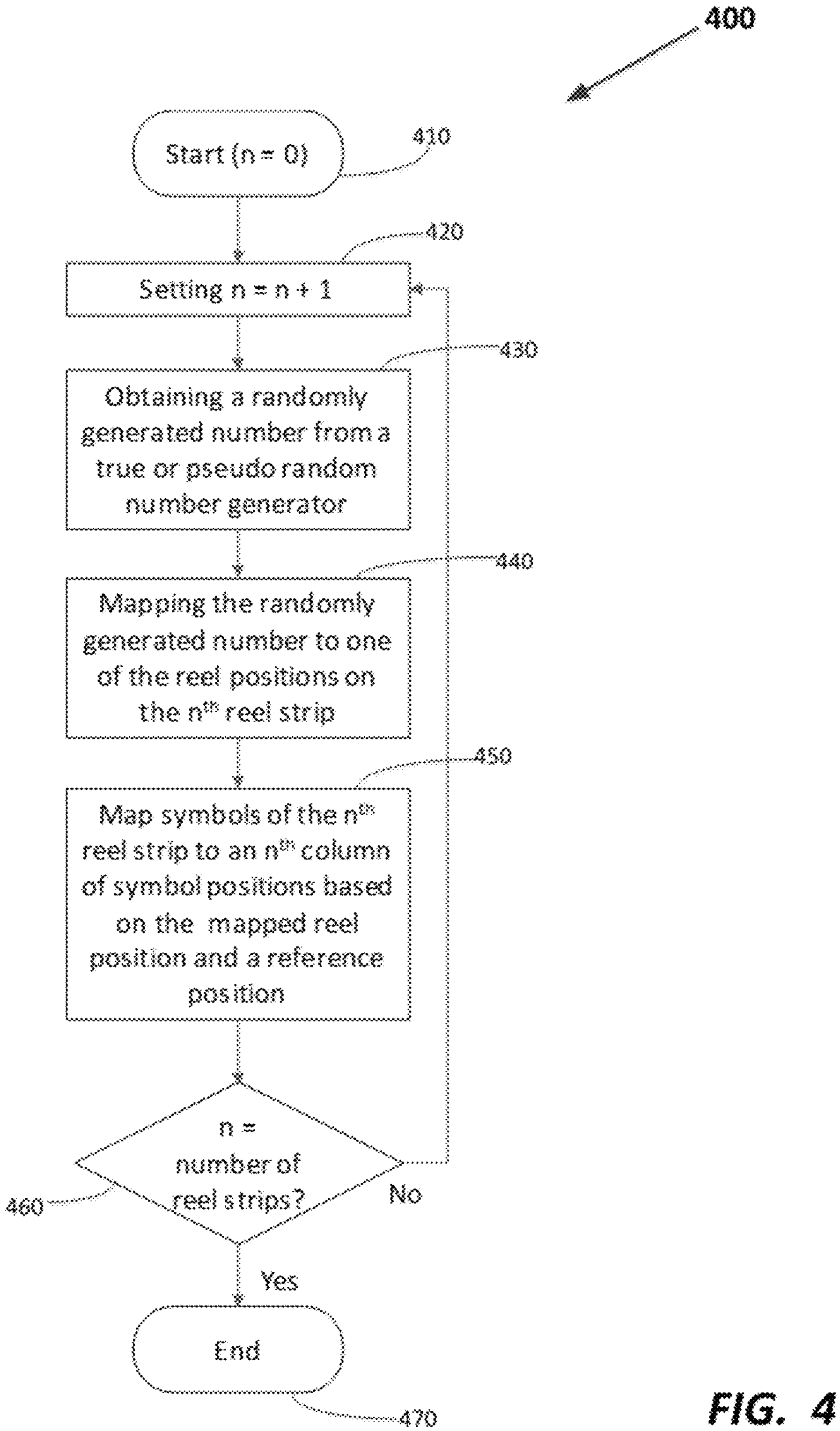
FIG. 4 is a flow chart of a symbol selection method.

FIG. 4 is a flow chart of an example method 400 carried out by processor 204 to select symbols from reel strips at step 510. At step 410, processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions.

At step 450, the processor 204 maps symbols of the nth reel strip to an nth column of symbol display positions based on the mapped reel position and a reference position. In an example, the reference position is the bottom position of the symbol positions of each column of symbol positions. That is, the symbol positions in bottom row 811. In this example, the selected reel position (and hence the symbol at this position) is mapped to the bottom symbol position of the column. Referring to the example reel strips of FIG. 3, if the value returned by the RNG 212 is mapped to reel position 313 when three symbols are being selected from each reel strip, then for the first reel strip 341, "10" is mapped to a first, bottom symbol position, "PIC3" symbol is mapped to a second symbol position, and "A" symbol is mapped to a third symbol position, top symbol position.

At step 460, the processor 204 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. In other example, different numbers of symbols may be mapped to different numbers of symbol positions.

After the symbols of all reel strips have been mapped to symbol positions, the processor 204 controls display 240 to display them at the symbol positions as shown for example in FIG. 7.

After the symbols are selected, processor 204 evaluates the selected symbols at step 515 for one or more winning combinations based on a pay table stored in memory 208. In this example, processor 204 applies a win line based evaluation by processing the selected symbols to identify instances of the same symbol appearing from left to right on defined sets of symbol positions (lines), including one symbol from each column. Upon there being one or more winning combinations, processor 204 makes an award for each winning combination based on any selected bet multiplier, for example, by adding credit amounts defined by the pay table to a meter such as a win or credit meter in memory 208.

At step 520, processor 204 determines whether to trigger an award of a a plurality of free game instances (a "free games" feature). In an example, the trigger condition is that the selected symbols include three or more scatter (SCAT) symbols. As no scatter symbols have been selected in the example of FIG. 7, processor 204 will make a negative determination at step 520 and proceed to step 525.

At step 525, processor 204 determines whether to trigger an instance of the jackpot feature. In an example, the trigger mechanic for the jackpot feature is for processor 204 to conduct a random determination using RNG 212 and a probability defined in memory 208 for each GOLD PIC4 symbol selected at step 510. In this example, PIC4 symbols are butterfly symbols and GOLD PIC4 symbols are butterfly symbols that have predominantly gold coloring. Having two versions of the PIC4 symbol with some common and some different visual characteristics, visually indicates that they have some common functionality and some different functionality. In this example, PIC4 and GOLD PIC4 symbols have the common functionality of substituting for all symbols except WILD and SCAT symbols in winning combinations and repeating the amount won in winning combinations. GOLD PIC4 symbols have the additional function of being retained in subsequent game instances during the free games feature game provided a condition is met as described further below.

In FIG. 7, a GOLD PIC4 symbol 751 has been selected. Accordingly, processor 204 will make a random determination as to whether to trigger the jackpot feature. If processor 204 makes a negative determination, the game ends (e.g., step 555). If processor 204 makes a positive determination, processor 204 controls the display 240 to transition to display of the jackpot feature such as in the example screen display 800 of FIG. 8.

At step 535 processor 204 selects symbols from jackpot reel strips using the process outlined in relation to FIG. 4 above. In an example, the jackpot reel strips are made up of symbols that each have one of a set of possible numerical values (in this example, 1, 2, 3, 4 and 5). In this example, processor 204 selects from three jackpot reel strips for three columns of symbol positions 821-823.

Figure 8:
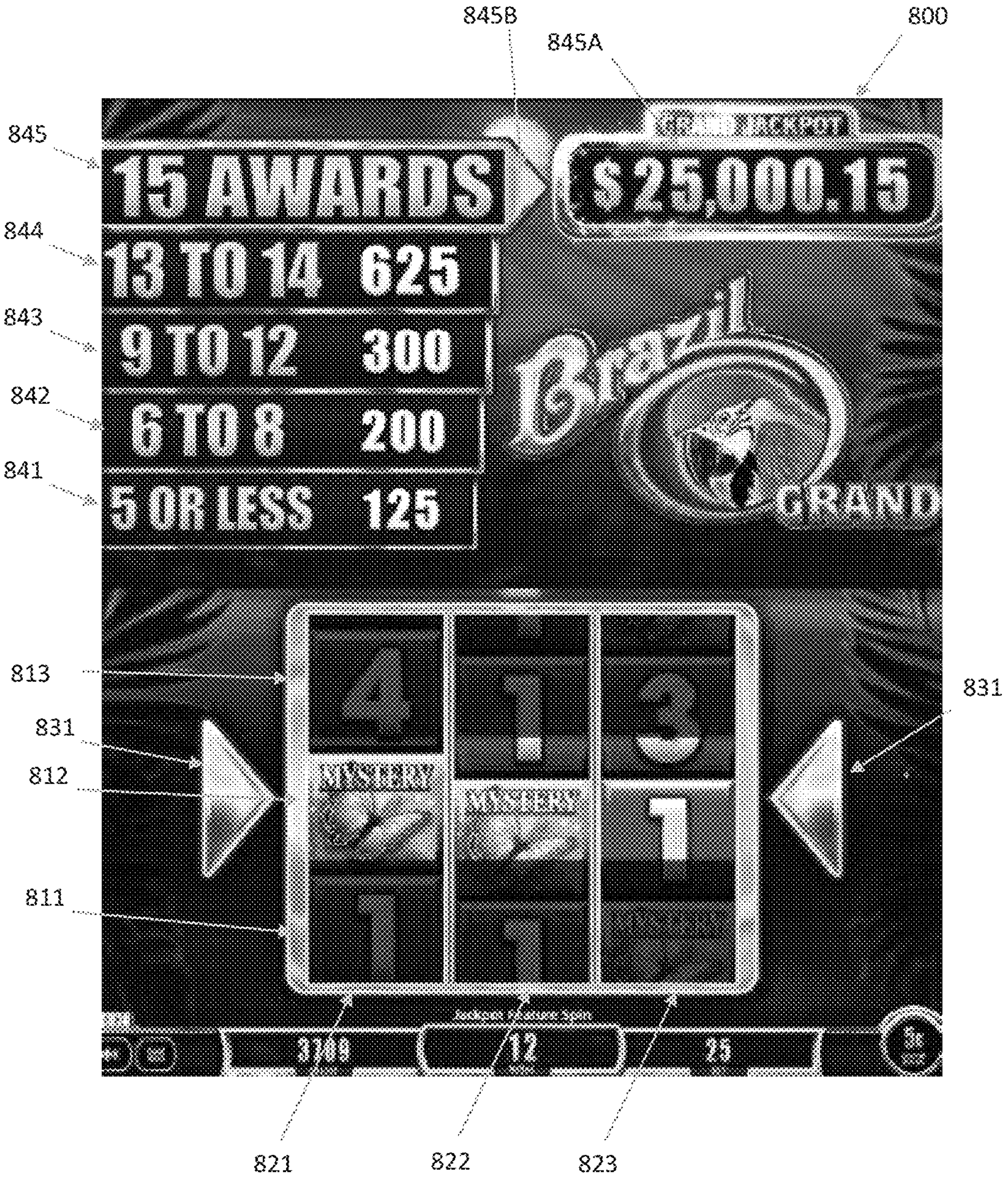

While in FIG. 8, three symbol positions are displayed in each column 821-823 such that there are three displayed rows of symbol positions 811-813, only the middle row 812 is evaluated as indicated by arrows and middle row 812 being lit while top and bottom rows 813, 811 are greyed out. Thus, in this example, the symbol positions of the middle row are a defined set of symbol positions that are evaluated by the processor 204.

In this respect, at step 540 processor 204 determines a total of the values on the symbols displayed at the defined set of symbol positions. Then, at step 545, processor 204 makes an award based on the determined total and a pay table stored in memory that associates possible totals derivable from the set of numerical values with prizes. In this respect, FIG. 8 has prize indicators 841-845 that indicate the prizes associated with different possible totals in pay table in accordance with an example implementation. Specifically, first prize indicator 841 indicates an award for a total of "5 or less" of 125 credits; second prize indicator 842 indicates an award for a total of "6 to 8" of 200 credits; third prize indicator 843 indicates an award for a total of "9 to 12" of 300 credits; fourth prize indicator 844 indicates an award for a total of "13 to 14" of 625 credits; and fifth prize indicator 845 has the game message "15 Awards" and an arrow 845B pointing to a current value 845A of a progressive jackpot prize, here referred to as the "Grand Jackpot".

In an example, all of the "5" symbols, and some of the "4" and "3" symbols are displayed as MYSTERY symbols while the processor 204 animates the reels as spinning (such as in FIG. 8 where it can be seen that symbols on the animated reels are not aligned with the symbol positions) so that the numerical values are hidden at least while the reels are spinning, and the numerical values are only revealed after the reels are stopped by an animation that transitions from the MYSTERY symbol to the relevant numerical value symbol. In this example, the use of MYSTERY symbols advantageously hides the game outcome until the numerical value symbol(s) are revealed. In other examples, rather than having a set value, MYSTERY symbols may have their values dynamically determined by processor 204 conducting a random determination using processor 204 and a weight table in memory 208 to assign a numerical value each time a MYSTERY symbol is selected.

Figure 9:
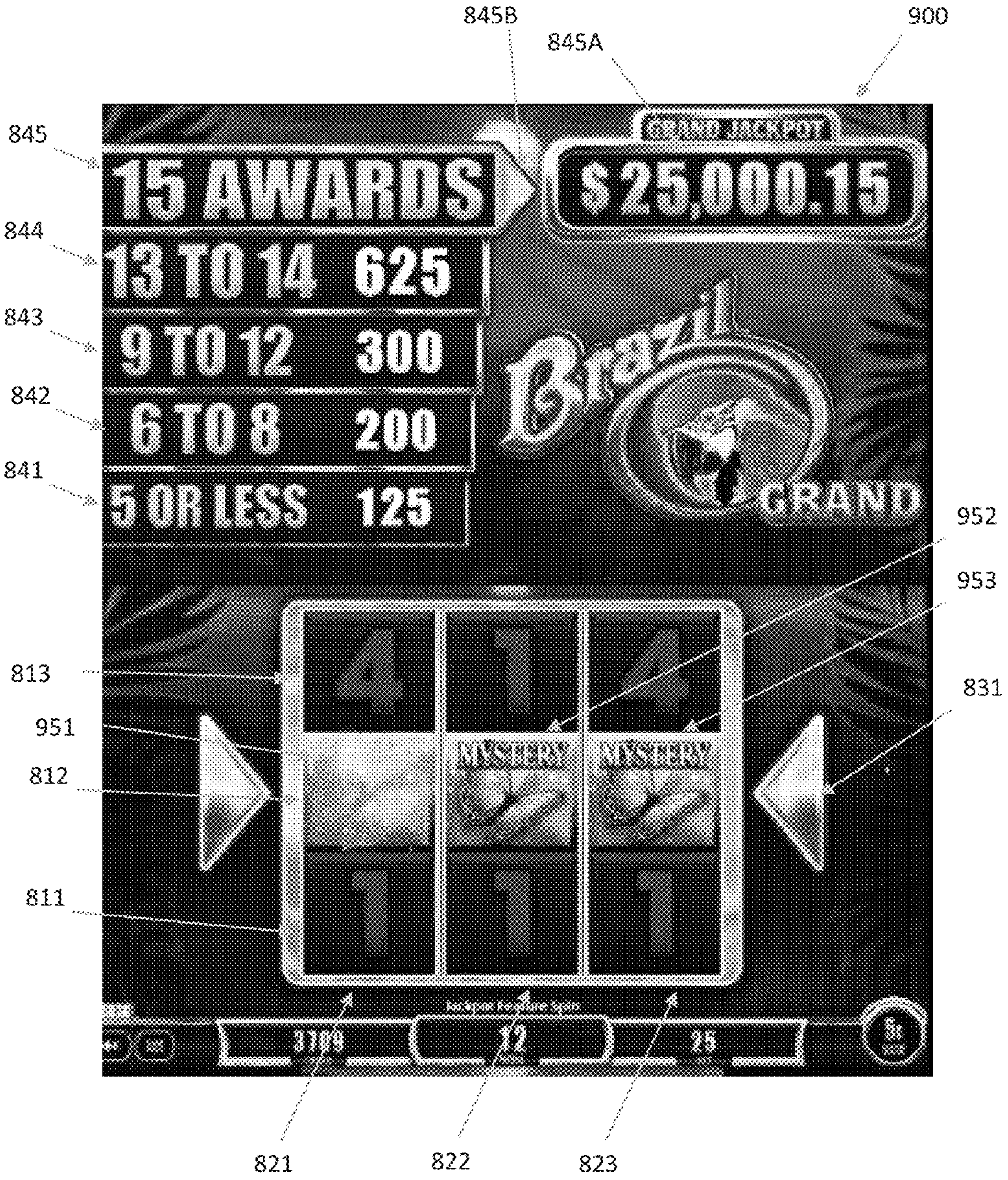

FIG. 9 is an example screen display 900 where three MYSTERY symbols 951-953 have been selected in the defined set of symbol positions (here the middle row 812 of symbol positions). In FIG. 9, processor 204 has begun a reveal animation in which the numerical values behind the MYSTERY symbols are revealed one by one from left to right. In this example, the MYSTERY symbols 952, 953 in the second and third columns 822, 823 are in a hidden state while MYSTERY symbol 951 in the first column 821 is in a transition state where the processor 204 controls the display to animate the relevant MYSTERY symbol as changing from the hidden state to a reveal state in which the numerical value symbol is revealed.

Figure 10:

FIG. 10 is an example of a screen display in which all three MYSTERY symbols 951-953 have been changed by processor 204 to be in a reveal state in which the numerical values are revealed. In this example, revealing a "4" symbol 1051 in first column 821, a "5" symbol 1052 in second column 822, and a "4" symbol 1053 in third column 823. In this example, at step 540, processor 204 will determine a total of 13. Then at step 545, processor 204 will make an award of 625 credits because the pay table defines an award of 625 credits for a total of 14 at this bet level as shown by fourth prize indicator 844.

Figure 11:
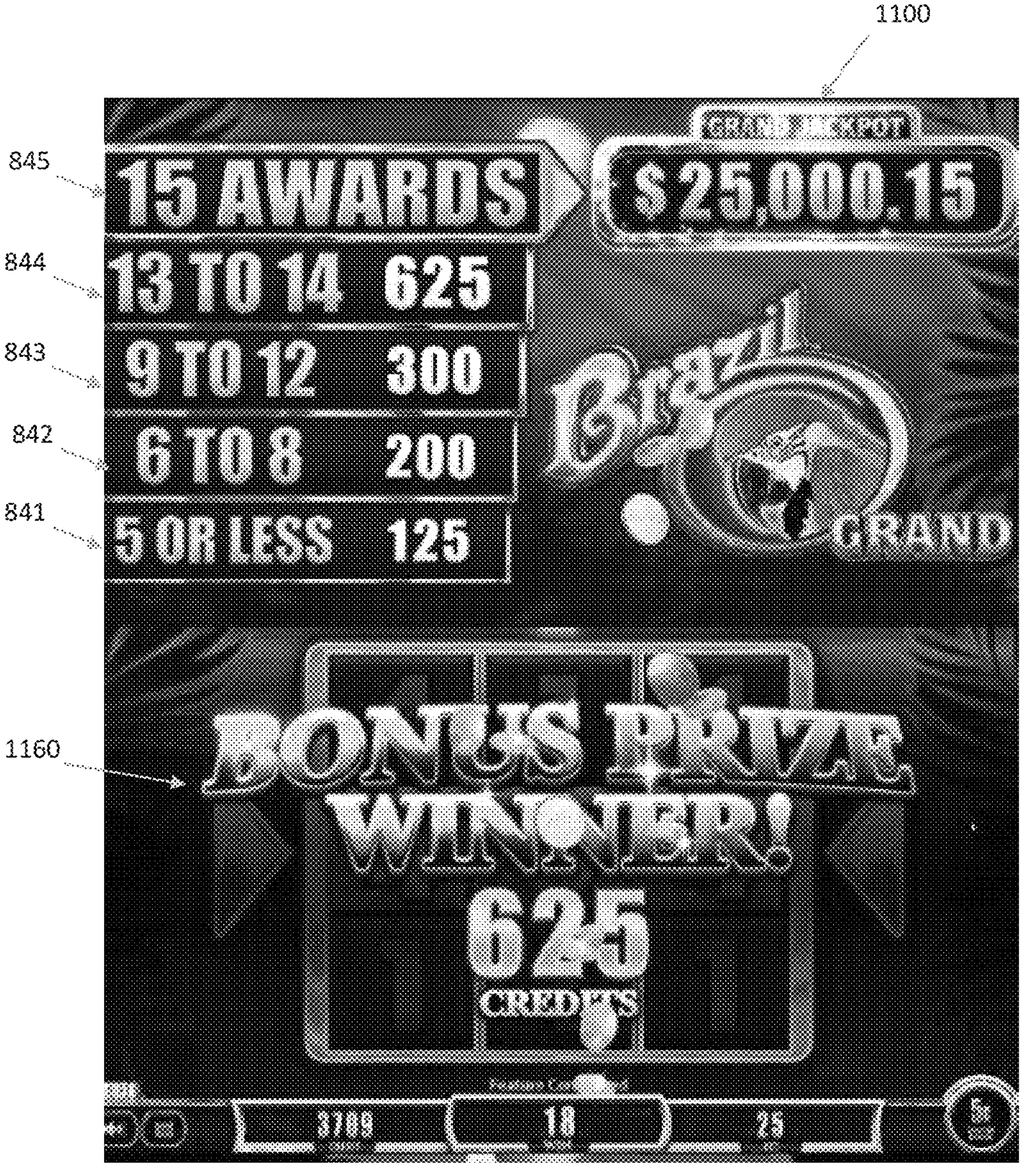

In this example, when making the award, processor 204 controls the display 240 to display an award screen 1100 with the award message "Bonus Prize Winner! 625 Credits" as shown in FIG. 11.

Figure 12:

FIG. 12 is another example of a screen display 1200 following symbol selection by processor 204 from jackpot reel strips. In this example, symbol selection has resulted in a "3" symbol 1251 in first column 821, a "1" symbol 1252 in second column 822, and a "1" symbol 1253 in third column 823. In this example, at step 540, processor 204 will determine a total of 5. Then at step 545, processor 204 will make an award of 125 credits because the pay table in memory 208 defines an award of 125 credits for a total of 5 or less at this bet level as shown by first prize indicator 841. It will be observed that in FIG. 12 the background of the "3" symbol 1251 is different to the backgrounds of the "1" symbols 1252, 1253. This is because in this example, "3" symbol was originally a MYSTERY symbol and is now displayed in the reveal state. As described above, in this example, only some of the symbols on jackpot reel strips having the numerical value of "3" are MYSTERY symbols, the other symbols having the numerical value of "3" have the same background as the "1" symbols. The use of the different backgrounds acts as a visual indicator of the path taken to reach the end outcome.

Figure 13:
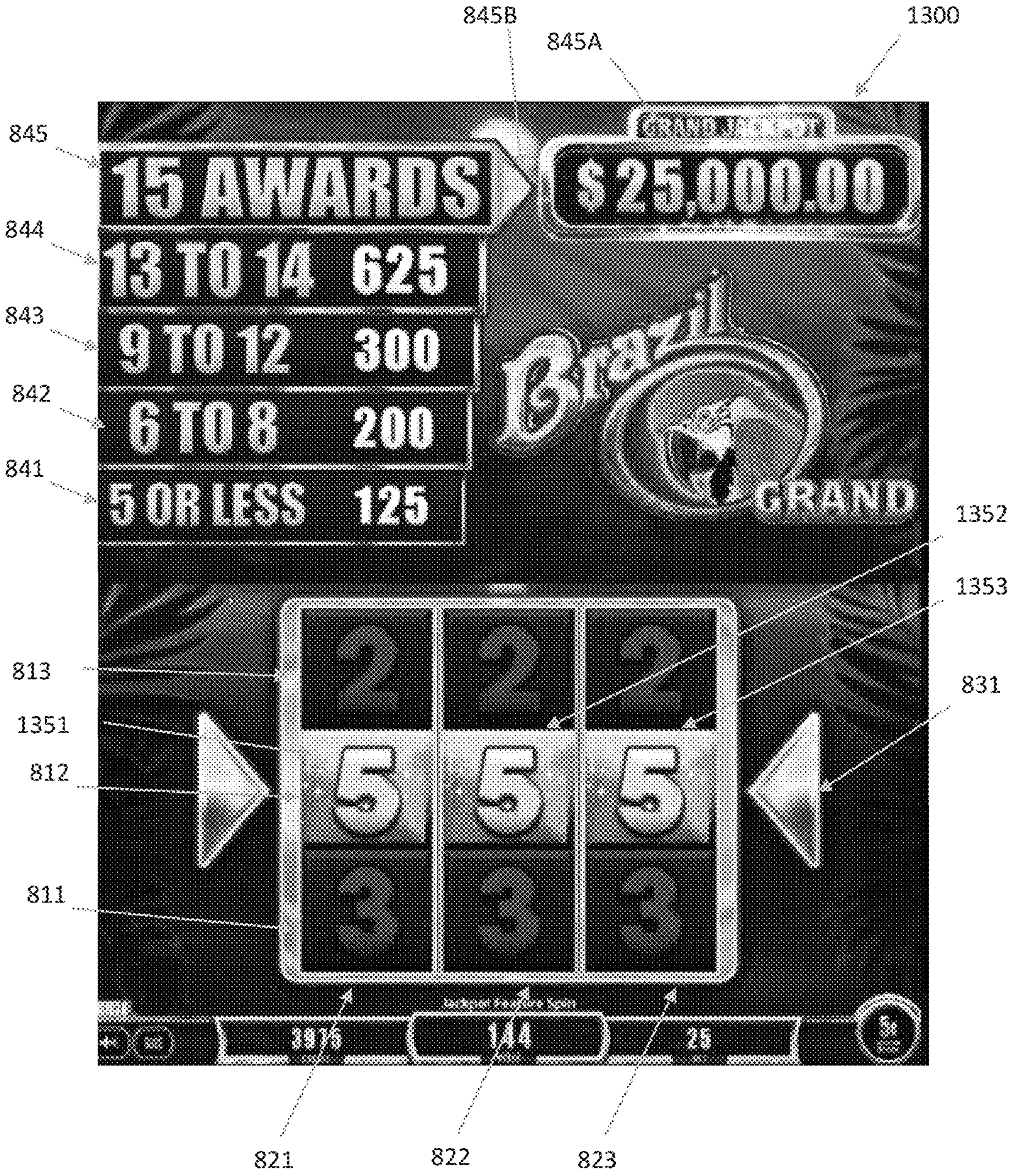

FIG. 13 is another example of a screen display 1300 following symbol selection by processor 204 from jackpot reel strips corresponding to the award of the Grand Jackpot prize. In this example, symbol selection has resulted in the selection of three MYSTERY symbols which are shown in the reveal state in the screen display 1300 as a "5" symbol 1351 in first column 821, a "5" symbol 1352 in second column 822, and a "5" symbol 1353 in third column 823. In this example, at step 540, processor 204 will determine a total of 15. Then at step 545, processor 204 will make an award of Grand Jackpot prize as indicated by fifth prize indicator 845, the largest prize that can be awarded from the jackpot feature. As is known in the art, large awards such as a Grand Jackpot prize may require a special payment process within a casino or the like. Accordingly, in this example, processor 204 may make the award by adding the prize to a win meter and locking the gaming device until an attendant arrives to make a manual payment (e.g., by check) of the prize.

Figure 14:

In this example, when making the award, processor 204 controls the display 240 to display an award screen 1400 with the award message 1460 "Grand Jackpot Winner! $25,000.00" as shown in FIG. 14. In addition, in this example, a lighting effect 1470 has been added around the current jackpot value 845A to indicate award of the Grand Jackpot prize. It will be appreciated that the prize value shown in this award message will correspond to a current value of the Grand Jackpot progressive prize.

It will be observed that in this example, as MYSTERY symbols can only correspond to values of 3, 4 or 5, in outcomes where three MYSTERY symbols are selected, this visually communicates a minimum possible total of 9 and hence, in this example, that at a minimum a prize of 300 credits will be awarded. Put another way, three MYSTERY symbols indicate that two prize outcomes are excluded. Similarly, if at least two MYSTERY symbols are selected, the lowest prize outcome is excluded before the numerical values are revealed. Advantageously, this means that for at least some symbol selection outcomes involving MYSTERY symbols, one or more prize outcomes are excluded before the numerical values are revealed. It will be appreciated that a number of MYSTERY symbols required to exclude a prize and/or the prizes that are excluded can be adjusted by either adjusting the totals associated with prizes or the numerical values associated with MYSTERY symbols.

It will be observed that in this example, the numerical values of 1 to 5 result in possible totals between 3 and 15. Advantageously, this provides flexibility in terms of associating totals with different prize values while generating outcomes that are easy for the player to understand as they only need to add three low digits together to verify the outcome. However, other examples may use different numerical values, non-consecutive numerical values, more reel strips (e.g., 4 or 5 reel strips), etc in order to generate different ranges of possible totals which can be linked in memory 208 to prize values. In some examples, one or more totals may be associated with no prize, e.g., a lowest possible total.

It will also be observed that in this example, the set of symbol positions used to determine the total corresponds to the middle row of symbol positions. The use of this row advantageously visually communicates that the outcome is being generated by spinning reels. However, other sets of symbol positions could be used, e.g., the top or bottom rows, or only one row of symbol positions may be displayed. Other sets of symbol positions may be used with visual characteristics that indicate which symbol positions will be evaluated.

Figure 6:
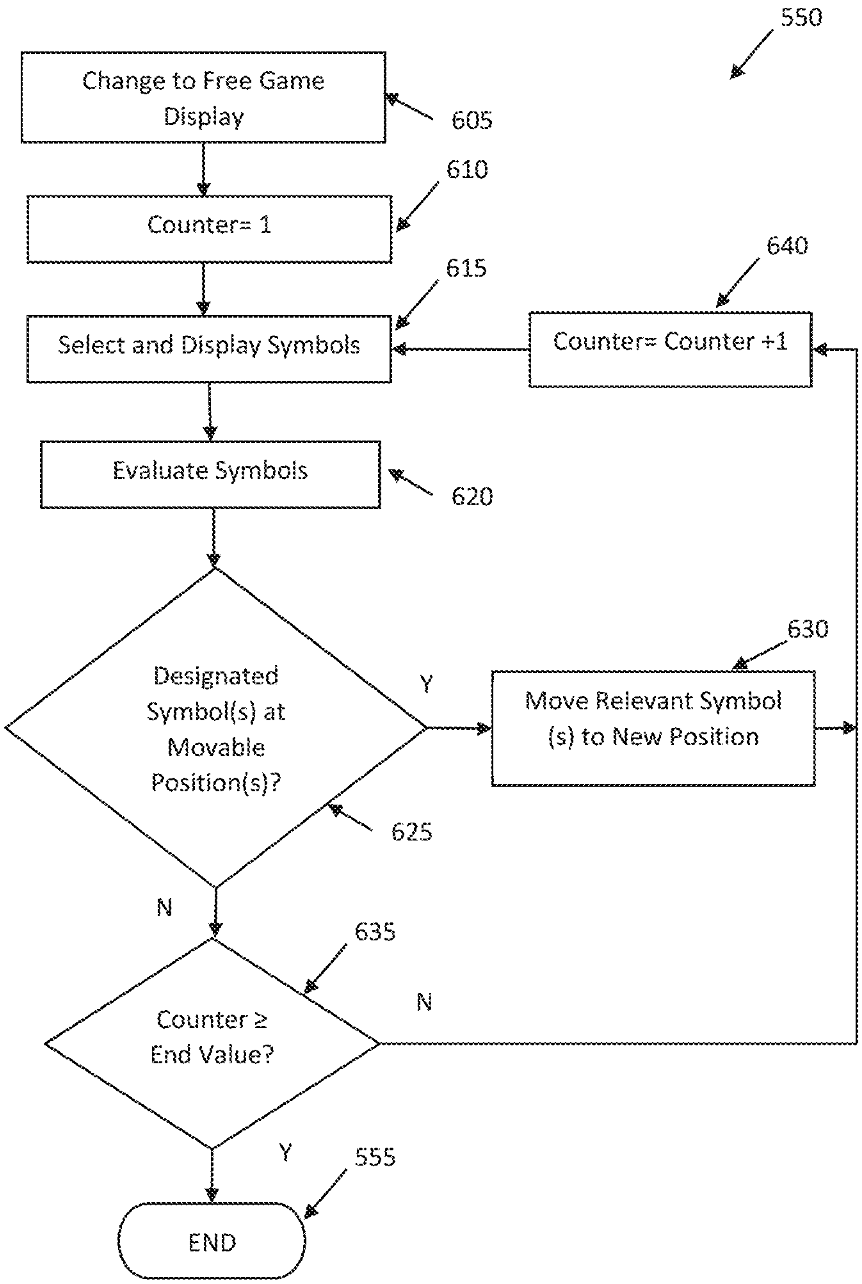
FIG. 6 is a flow chart showing detail of FIG. 5.
Figure 15:
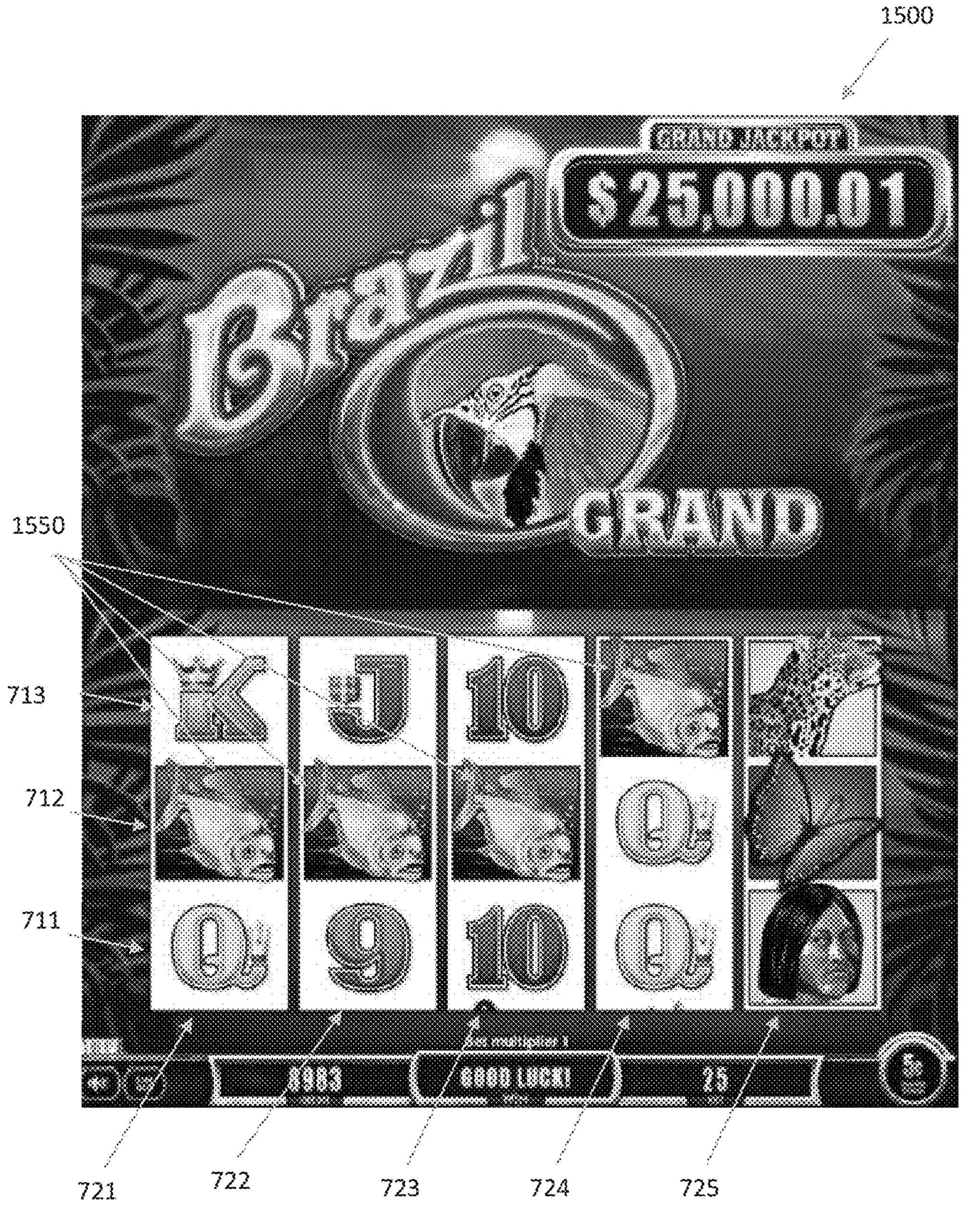

FIG. 15 is another example of a screen display 1500 of a base game outcome generated by processor 204 selecting symbols from reel strips at step 510. In this example, the selected symbols include four scatter symbols 1550, here having the visual characteristics of a fish. Accordingly, in this example, at step 520, processor 204 will make a positive determination and proceed to step 550 and conduct the free games. The process of conducting the free games is shown in more detail in FIG. 6.

Figure 16:

At step 605, processor 204 transitions to the free game display screen as shown by way of example in screen display 1600 of FIG. 16. In this example, a free game counter 1680 is added to indicate how many free games have been played (here "1 Free Game Played") and game message 1681 indicates how many games remain. In this example, five free games are awarded so game message 1681 currently states "4 Free Games Remaining" to indicate that four free games will be conducted after the current free game instance.

At step 610 processor 204 sets a free game counter to one to reflect that a first free game is to be conducted. At step 615 processor 204 selects symbols from reel strips using the process described in relation to FIG. 4 above and controls display 240 to display the reels spinning to a stop at the selected positions.

FIG. 16 shows an example where the reels corresponding to first to fourth columns 721-724 have stopped and the reel corresponding to the fifth column 725 is still being animated on display 240. In this respect, in this example, the animation implemented by processor 204 is to show the selected symbol of each reel as generally rotating downwards relative to the symbol positions and then at the end of the animation moving past the symbol position for which it has been selected and then bouncing back to the selected position.

Figure 17:

FIG. 16 captures this part of the animation in respect of fifth column, with PIC4 symbol 1651 displayed as mainly overlapping the top symbol position of fifth column 725 but partly overlapping the middle position before PIC4 bounces back to the top position as shown in FIG. 17. It will be observed from FIG. 16 that in this example screen display 1600, PIC4 symbols are also displayed in each symbol position of the first column 721. In FIG. 16, each PIC4 symbol is displayed in a base state. Once the processor 204 controls all of the reel strips to be at a stopped position as shown in FIG. 17, processor 204 also controls display of the PIC4 symbols to be in an award state (e.g. PIC4 symbol 1651A), where the text "Repeat Win" is added to the PIC4 symbols to indicate that a repeat win award will be applied for each PIC4 symbol.

At step 620, processor 204 evaluates the selected symbols based on pay table in memory 208 and any repeat wins that are to be applied and makes an award, for example by adding the awarded amount to win or credit meter in memory 208.

At step 625, processor 204 determines whether there is a designated symbol at a movable symbol position. In this example, the designated symbol is the GOLD PIC4 symbol. Accordingly, for the symbols shown as selected in FIG. 17, processor 204 will make a negative determination at step 625 as there are no GOLD PIC4 symbols and proceed to step 635 and determine whether the current value of the counter is equal to or greater than the end value. In this iteration, the counter value is one and accordingly, processor 204 makes a negative determination at step 635 and proceeds to step 640 and increments the counter by one; in this iteration to two. Processor 204 then begins another iteration by selecting and displaying symbols at step 615.

Figure 18:

FIG. 18 shows an example screen display 1800 from a subsequent iteration; in this example, a third free game. In this example, the selected symbols include three GOLD PIC4 symbols. Accordingly, the designated symbol criterion will be satisfied at step 625. In this example, the movable symbol position criterion is that one or more of the selected GOLD PIC4 symbols can be moved downwardly relative to the current row on which it is displayed by one symbol position and stay within the displayed symbol positions of columns 721-725. In the example of FIG. 18, all three GOLD PIC4 symbols satisfy this criterion as they are displayed in either the top row 713 or middle row 712. Accordingly, at step 630, processor 204 will animate the GOLD PIC4 symbols as moving to new positions by a defined movement (here one symbol position downwards).

Figure 19:
Figure 23A:
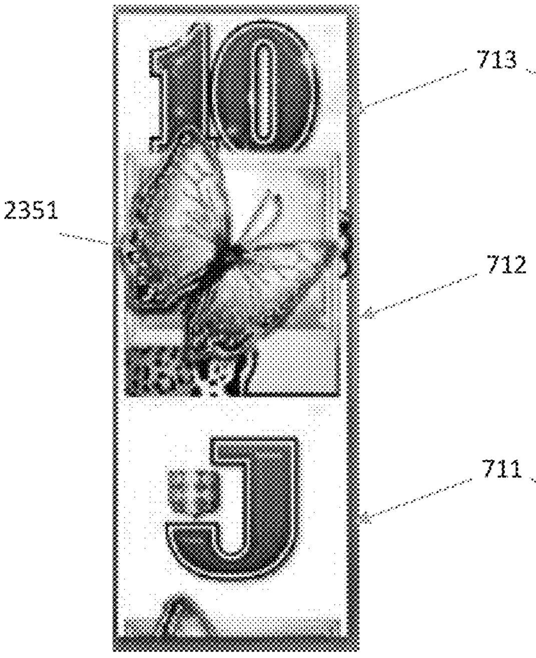
Figure 23B:
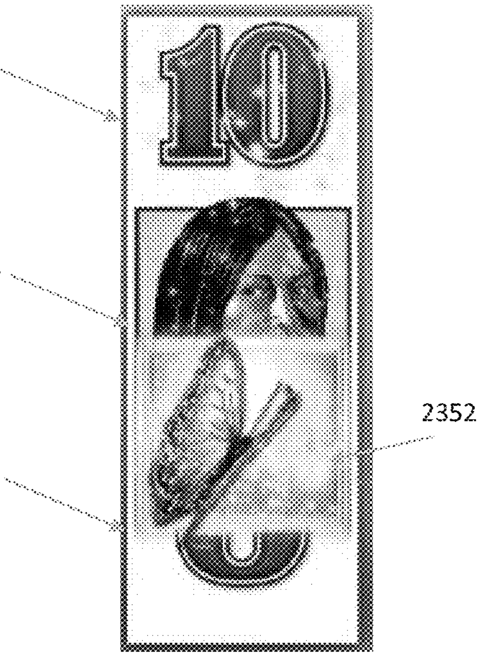
Figure 24:
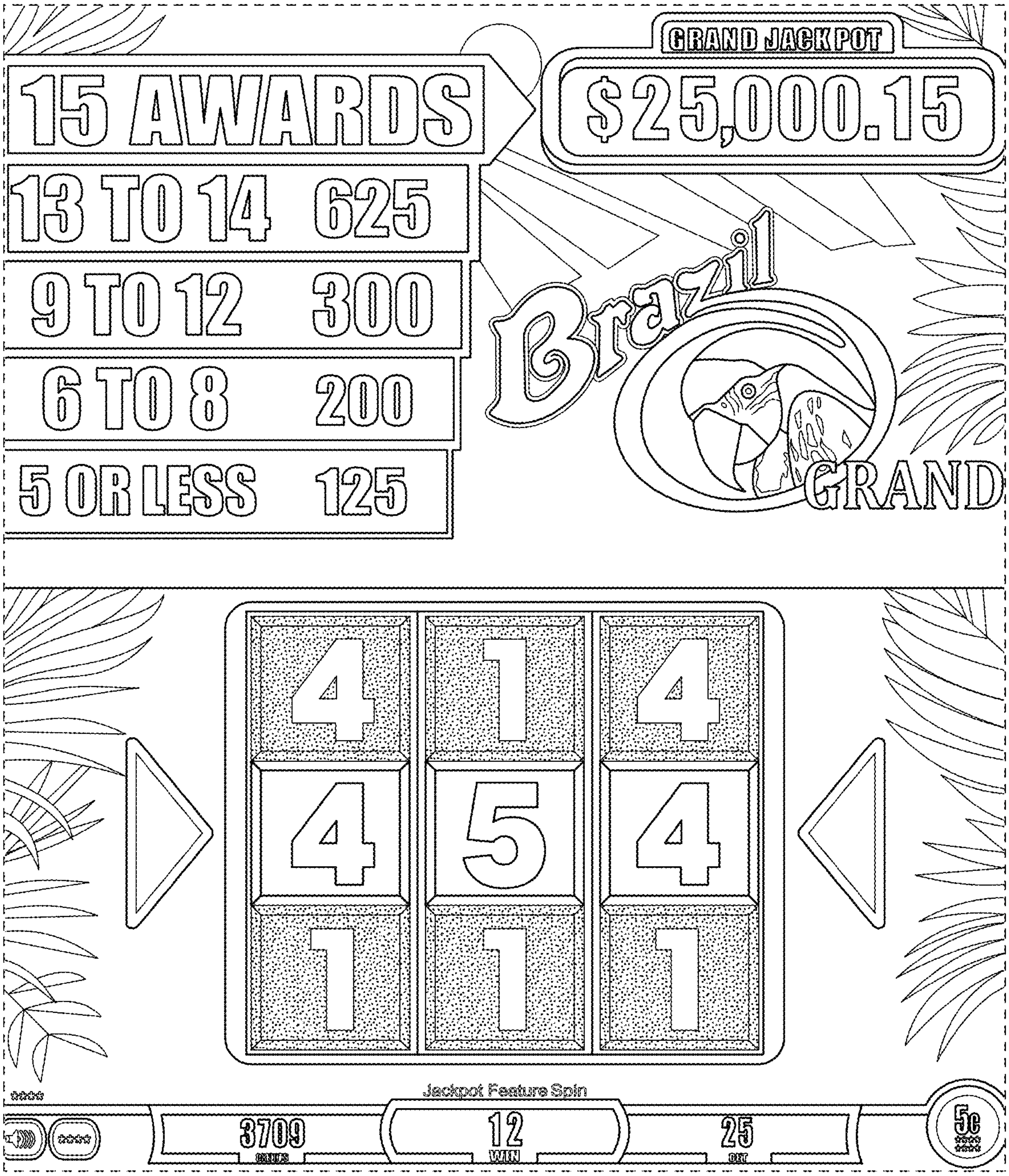
Figure 25:
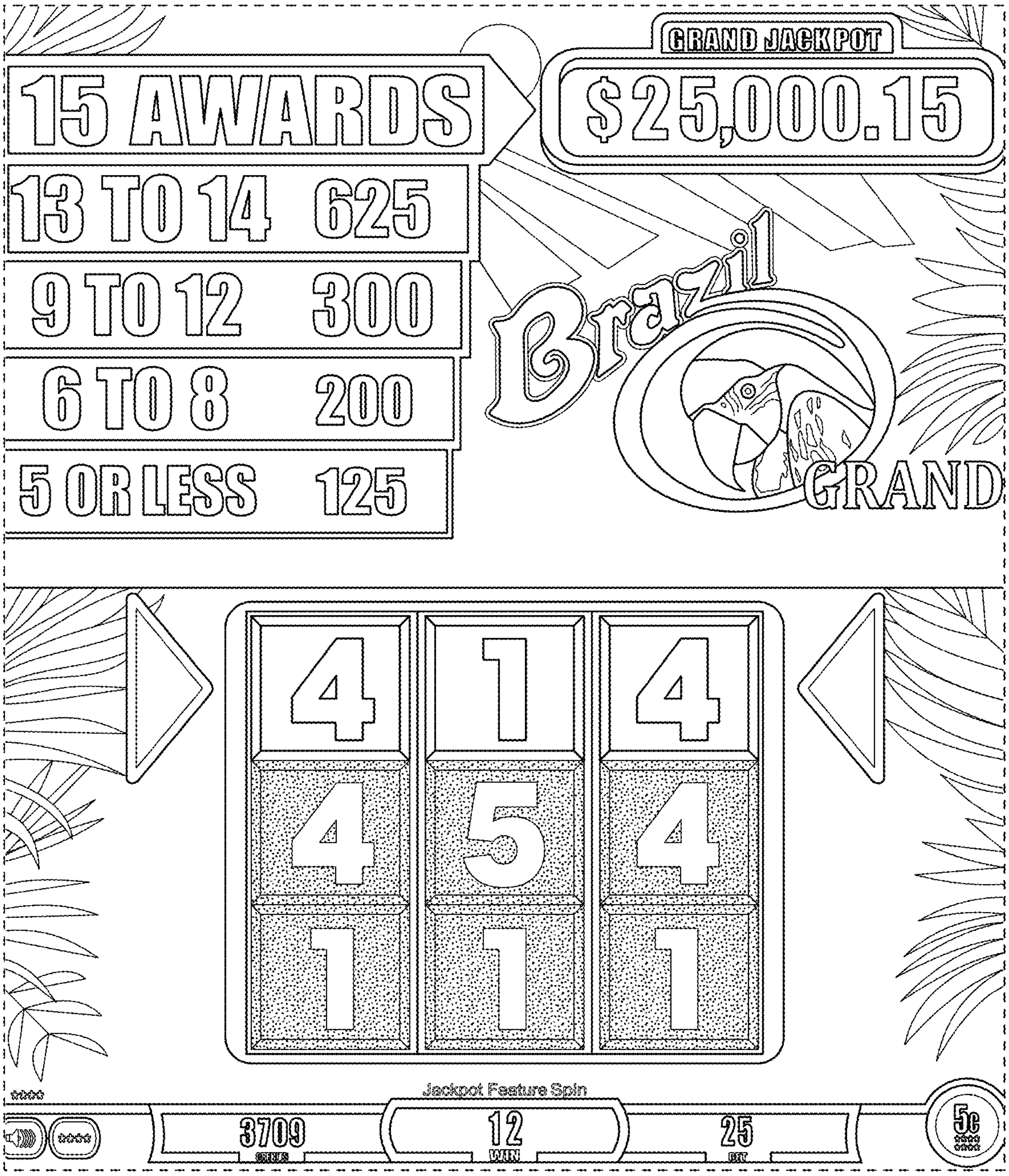
Figure 26:
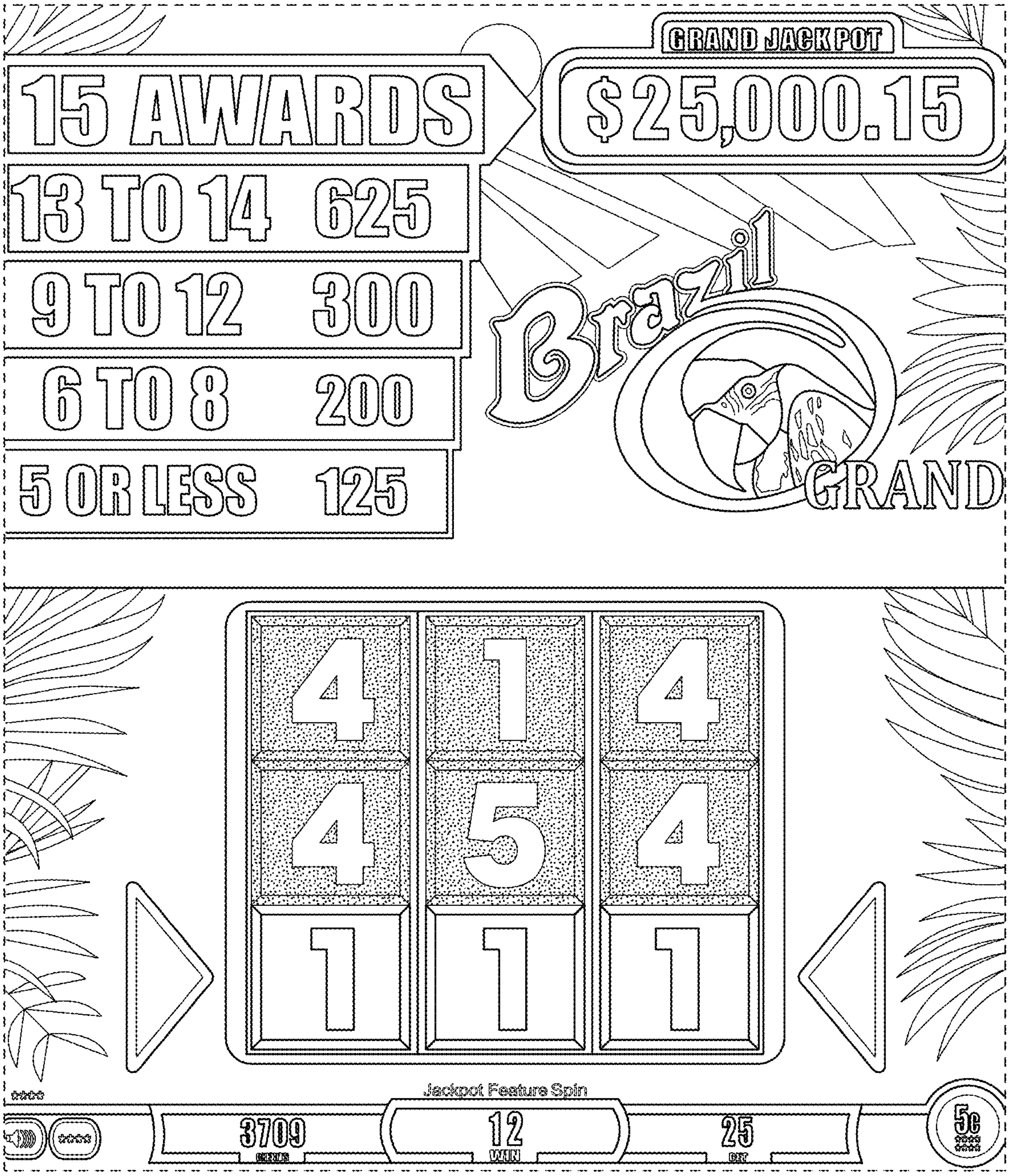
Figure 27:
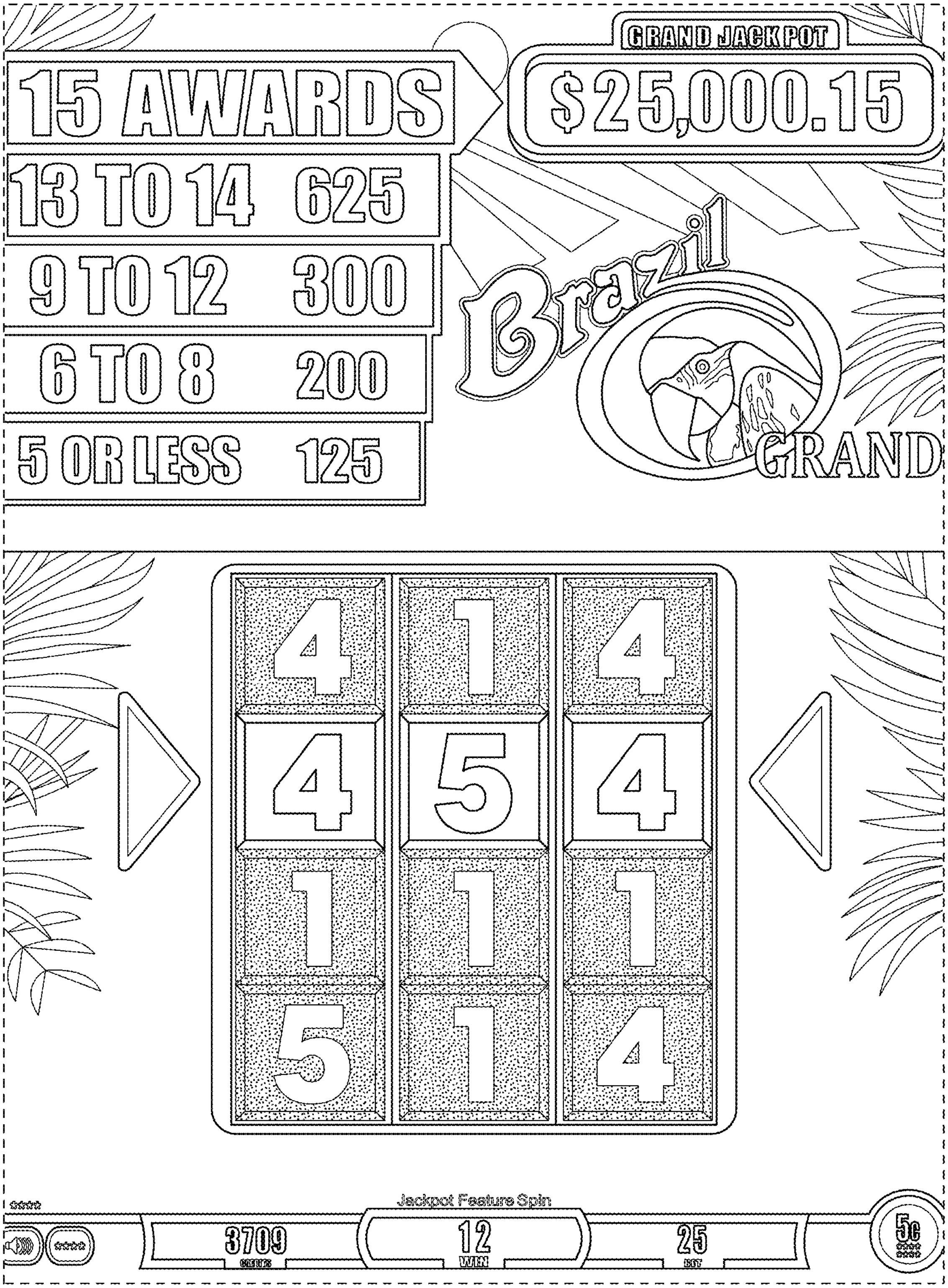
Figure 28:
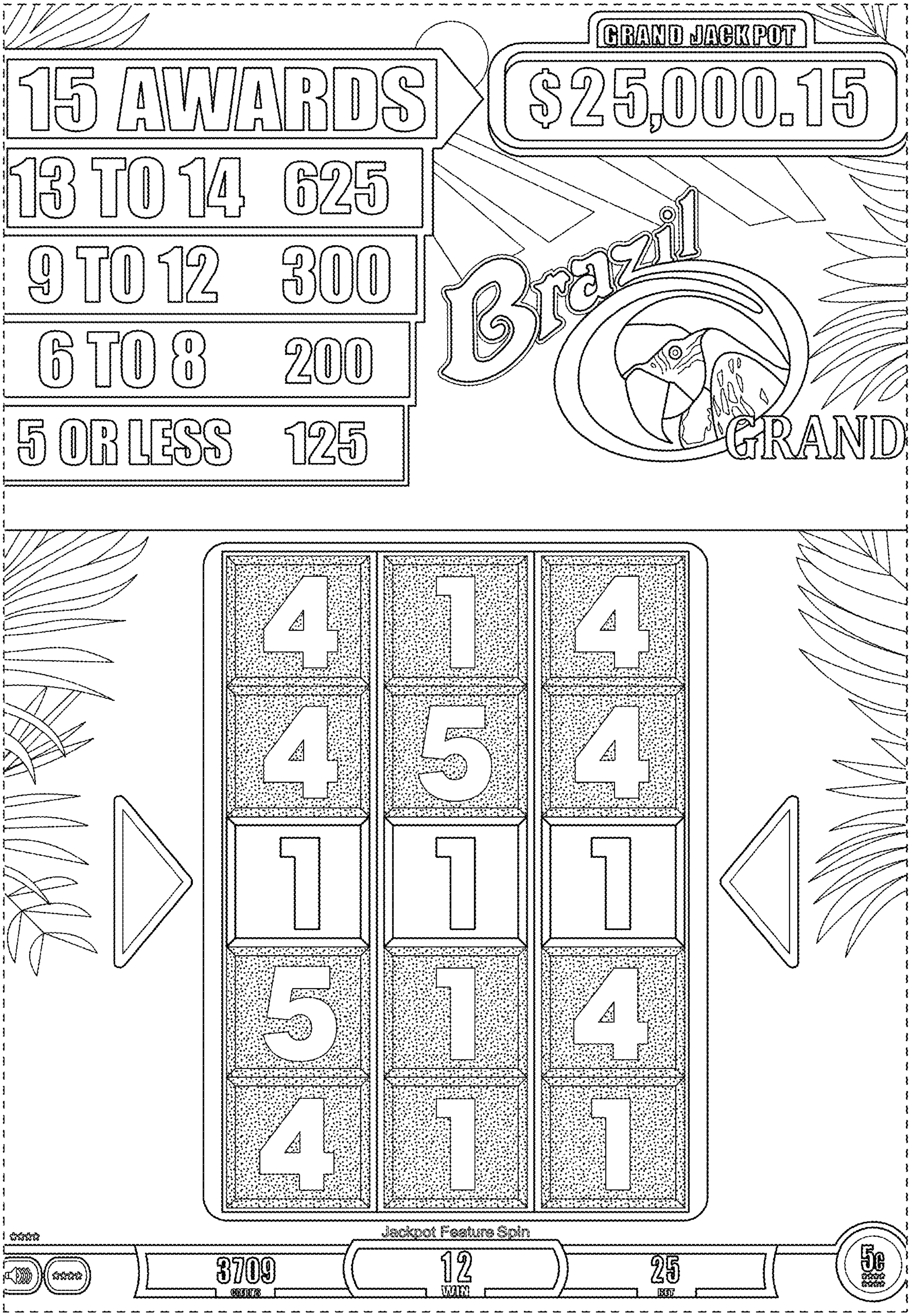

In an example, this animation shows the GOLD PIC4 symbols as lifting off the reels in their base state and sliding downwards relative to the symbol positions before settling at the position below. FIG. 19 shows an example screen display 1900 of the result of such movement where each of GOLD PIC4 symbols 1851-1853 of FIG. 18 have moved down by one symbol position and are shown in their base state at new symbol positions 1851A-1853A. FIGS. 23A and FIG. 23B illustrate part of the animation of this movement with FIG. 23A showing an example of a GOLD PIC4 symbol 2351 being animated as moving from a top row 713 to a middle row 712, and FIG. 23B showing an example of a GOLD PIC4 symbol 2352 being animated moving a middle row 712 to a bottom row. It will be observed that in this example, other symbols can be seen at each symbol position overlapped by the moving GOLD PIC4 symbol. Advantageously, the visual characteristics of the butterfly symbol employed for GOLD PIC4 symbol are conceptually related to a symbol that can lift off the displayed symbol positions and move to a new position.

It will be appreciated that other movement rules can be used, for example, upward or sideways movement and that a movable position is understood as a starting position where the movement rule can be applied with the relevant GOLD PIC4 symbol being moved to a displayed symbol position.

Figure 20:

After processor 204 has moved the symbols to new positions, processor 204 increments the counter at step 640 and begins a next iteration of selecting and displaying symbols at step 615. FIG. 20 shows an outcome of such a selection with GOLD PIC4 symbols now displayed in an award state 1851B-1853B.

Figure 21:

In the example of FIG. 20, the GOLD PIC4 symbol 1852B in the second column is no longer at a movable position as a downward movement will move it below the bottom row 711, however the other GOLD PIC4 symbols 1851B, 1853B are at movable positions and accordingly, processor 204 will make a positive determination at step 625 and proceed to step 630 and move the GOLD PIC4 symbols 1851B, 1853B downwardly to the positions shown in screen display 2100 of FIG. 21, where the retained GOLD PIC4 symbols 1851C, 1853C are displayed in a base state while the reel strips are animated as spinning. That is, in FIG. 21 the selected symbols have not been displayed for the fifth free game indicated by free game counter 1680.

It will be observed that when a GOLD PIC4 symbol is selected at a movable position, processor 204 does not check whether the counter has reached the end value. This enables the free game feature to continue while there is still a movable GOLD PIC4 symbol. Advantageously this enables the free game feature to continue beyond the initially awarded number of free games with each additional game being a bonus free game.

Figure 22:

FIG. 22 shows an example where the free games have continued to a ninth free game. Screen display 2200 shows that the selected symbols include three GOLD PIC4 symbols but they are all in bottom row 711 such none of them are at a movable position. Accordingly, processor 204 will make a negative determination at step 625. Then at step 635, because the current value of the counter is nine and is greater than or equal to the end value of five, processor 204 will make a positive determination and end the free games at step 555.

While not shown in this example, in some examples, it may be possible to retrigger the free games during the free game series. In which case after completing the current free game series, processor 204 iterates to step 610 and begins a new free game series.

FIGS. 24-28 illustrate example screenshots and/or interfaces in accordance with the present disclosure.

The present embodiments may also be said broadly to consist in the parts, elements and features referred to or indicated in the specification of the application, individually or collectively, in any or all combinations of two or more of said parts, elements or features.

Although the present embodiments have been described by way of example, it should be appreciated that variations and modifications may be made without departing from the scope of the present embodiments as defined in the claims. Furthermore, where known equivalents exist to specific features, such equivalents are incorporated as if specifically referred in this specification.

What is claimed is:

1. An electronic gaming device comprising:

at least one memory with instructions stored thereon; and at least one processor in communication with the at least one memory, wherein the instructions, when executed by the at least one processor, cause the at least one processor to:

select a plurality of symbols from a set of symbols for a play of an electronic game on a plurality of reels, wherein the plurality of symbols comprise a plurality of numerical values from a set of numerical values in the at least one memory;

determine that at least one symbol of the plurality of symbols comprises at least one numerical value of the plurality of numerical values within a predefined range of numerical values stored in the at least one memory;

cause the plurality of reels to spin, wherein based upon the at least one numerical value being within the predefined range, the at least one symbol is displayed in a hidden state while the plurality of reels are spinning such that the at least one numerical value is not displayed while the plurality of reels are spinning;

cause display of the plurality of numerical values other than the at least one numerical value such that the plurality of numerical values other than the at least one numerical value within the predefined range are displayed while the at least one symbol is displayed in the hidden state and the plurality of reels are spinning;

cause the plurality of reels to stop spinning such that a first subset of the plurality of symbols comprising a first subset of the plurality of numerical values and the at least one symbol that is displayed in the hidden state are displayed in a first display area that is illuminated and a second subset of the plurality of symbols are displayed in a second display area that is dull;

cause display of a reveal animation in the first display area that causes the at least one symbol to transition between the hidden state and a revealed state, wherein when the at least one symbol is displayed in the revealed state, the at least one numerical value is displayed; and provide an output amount associated with a sum of the first subset of the plurality of numerical values and the at least one numerical value.

2. The electronic gaming device of claim 1, wherein the instructions further cause the at least one processor to cause display of a background at at least one symbol position including the at least one symbol to indicate that the at least one symbol transitions between the hidden state and the revealed state.

3. The electronic gaming device of claim 2, wherein the instructions further cause the at least one processor to cause display of the background at the at least one symbol position when the at least one symbol is in the hidden state.

4. The electronic gaming device of claim 3, wherein the instructions further cause the at least one processor to cause display of the background at the at least one symbol position when the at least one symbol is in the revealed state.

5. The electronic gaming device of claim 1, wherein the instructions further cause the at least one processor to:

determine that the at least one symbol is a mystery symbol;

based upon determining that the at least one symbol is the mystery symbol, randomly determine the at least one numerical value from numerical values within the predefined range to assign to the at least one symbol based upon at least one output from a random number generator (RNG) and at least one weight table associated with the predefined range of numerical values and stored within the at least one memory; and assign the at least one numerical value to the at least one symbol in the at least one memory.

6. The electronic gaming device of claim 1, wherein the instructions further cause the at least one processor to cause display of a plurality of output amounts as being associated with a plurality of potential sums of the set of symbols.

7. The electronic gaming device of claim 6, wherein the output amount is displayed as being associated with the sum of the plurality of numerical values before the output amount is provided.

8. The electronic gaming device of claim 1, wherein the instructions further cause the at least one processor to select the plurality of symbols based upon a message received from a server, wherein the message is associated with the output amount.

9. The electronic gaming device of claim 1, wherein the electronic game comprises a feature game associated with a feature matrix that is triggered from a base game associated with a base matrix.

10. The electronic gaming device of claim 9, wherein the instructions further cause the at least one processor to:

determine that a trigger condition to trigger the feature game was satisfied in the base game based upon a base outcome displayed in the base matrix;

cause display of a transition between the base game and the feature game comprising replacing the base matrix with the feature matrix, the feature matrix being of a different size than the base matrix; and cause a plurality of feature reel strips to be provided on the plurality of reels in the feature matrix, the plurality of feature reel strips comprising the plurality of symbols.

11. At least one non-transitory computer-readable storage medium with instructions stored thereon that, in response to execution by at least one processor, cause the at least one processor to:

determine a plurality of symbols from a set of symbols for a play of an electronic game on a plurality of reels, wherein the plurality of symbols comprise a plurality of numerical values from a set of numerical values in the at least one non-transitory computer-readable storage medium;

identify that at least one symbol of the plurality of symbols comprises at least one numerical value of the plurality of numerical values within a predefined range of numerical values stored in the at least one non-transitory computer-readable storage medium;

cause the plurality of reels to spin, wherein based upon the at least one numerical value being within the predefined range, the at least one symbol is displayed in a hidden state while the plurality of reels are spinning such that the at least one numerical value is not displayed while the plurality of reels are spinning;

cause the plurality of numerical values other than the at least one numerical value to be displayed such that the plurality of numerical values other than the at least one numerical value within the predefined range are displayed while the at least one symbol is displayed in the hidden state and the plurality of reels are spinning;

cause the plurality of reels to stop spinning such that a first subset of the plurality of symbols comprising a first subset of the plurality of numerical values and the at least one symbol that is displayed in the hidden state are displayed in a first display area that is illuminated and a second subset of the plurality of symbols are displayed in a second display area that is dull;

cause a reveal animation to be displayed in the first display area that causes the at least one symbol to transition between the hidden state and a revealed state, wherein when the at least one symbol is displayed in the revealed state, the at least one numerical value is displayed; and cause an output amount associated with a sum of the first subset of the plurality of numerical values and the at least one numerical value to be provided.

12. The at least one non-transitory computer-readable storage medium of claim 11, wherein the instructions further cause the at least one processor to cause a background to be displayed at at least one symbol position including the at least one symbol to indicate that the at least one symbol transitions between the hidden state and the revealed state.

13. The at least one non-transitory computer-readable storage medium of claim 12, wherein the instructions further cause the at least one processor to cause the background to be displayed at the at least one symbol position when the at least one symbol is in the hidden state.

14. The at least one non-transitory computer-readable storage medium of claim 13, wherein the instructions further cause the at least one processor to cause the background to be displayed at the at least one symbol position when the at least one symbol is in the revealed state.

15. The at least one non-transitory computer-readable storage medium of claim 11, wherein the instructions further cause the at least one processor to:

determine that the at least one symbol is a mystery symbol;

based upon determining that the at least one symbol is the mystery symbol, randomly determine the at least one numerical value from numerical values within the predefined range to assign to the at least one symbol based upon at least one output from a random number generator (RNG) and at least one weight table associated with the predefined range of numerical values and stored within the at least one non-transitory computer-readable storage medium; and assign the at least one numerical value to the at least one symbol in the at least one non-transitory computer-readable storage medium.

16. The at least one non-transitory computer-readable storage medium of claim 11, wherein the instructions further cause the at least one processor to cause a plurality of output amounts to be displayed as being associated with a plurality of potential sums of the set of symbols.

17. The at least one non-transitory computer-readable storage medium of claim 16, wherein the output amount is displayed as being associated with the sum of the plurality of numerical values before the output amount is provided.

18. The at least one non-transitory computer-readable storage medium of claim 11, wherein the instructions further cause the at least one processor to at least one of cause the at least one symbol to be displayed in the hidden state, cause the plurality of symbols other than the at least one symbol to be displayed, cause the at least one symbol to be displayed as transitioning between the hidden state and the revealed state, or cause the output amount to be provided by transmitting one or more messages to an electronic gaming device where the electronic game is displayed.

19. A method of electronic gaming implemented by one or more processors in communication with one or more memories, the method comprising:

selecting a plurality of symbols from a set of symbols for a play of an electronic game on a plurality of reels, wherein the plurality of symbols comprise a plurality of numerical values from a set of numerical values in the one or more memories;

determining that at least one symbol of the plurality of symbols comprises at least one numerical value of the plurality of numerical values within a predefined range of numerical values stored in the one or more memories;

causing the plurality of reels to spin, wherein based upon the at least one numerical value being within the predefined range, the at least one symbol is displayed in a hidden state while the plurality of reels are spinning such that the at least one numerical value is not displayed while the plurality of reels are spinning;

causing display of the plurality of numerical values other than the at least one numerical value such that the plurality of numerical values other than the at least one numerical value within the predefined range are displayed while the at least one symbol is displayed in the hidden state and the plurality of reels are spinning;

causing the plurality of reels to stop spinning such that a first subset of the plurality of symbols comprising a first subset of the plurality of numerical values and the at least one symbol that is displayed in the hidden state are displayed in a first display area that is illuminated and a second subset of the plurality of symbols are displayed in a second display area that is dull;

causing display of a reveal animation in the first display area that causes the at least one symbol to transition between the hidden state and a revealed state, wherein when the at least one symbol is displayed in the revealed state, the at least one numerical value is displayed; and providing an output amount associated with a sum of the first subset of the plurality of numerical values and the at least one numerical value.

20. The method of claim 19, further comprising causing display of a background at at least one symbol position including the at least one symbol to indicate that the at least one symbol transitions between the hidden state and the revealed state, wherein the background is displayed at the at least one symbol position when the at least one symbol is in the hidden state and when the at least one symbol is in the revealed state.

* * * * *